United States Patent
Lin et al.

(10) Patent No.: US 12,476,307 B2
(45) Date of Patent: Nov. 18, 2025

(54) BATTERY CELL COMPRISING PROTECTIVE MEMBER FOR PREVENTING SHORT CIRCUIT, BATTERY COMPRISING THE BATTERY CELL, AND ELECTRIC APPARATUS COMPRISING THE BATTERY

(71) Applicant: CONTEMPORARY AMPEREX TECHNOLOGY CO., LIMITED, Ningde (CN)

(72) Inventors: Denghua Lin, Ningde (CN); Xinxiang Chen, Ningde (CN); Shoujun Huang, Ningde (CN); Yan Luo, Ningde (CN); Yulian Zheng, Ningde (CN); Peng Wang, Ningde (CN); Haizu Jin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/212,735

(22) Filed: May 20, 2025

(65) Prior Publication Data

US 2025/0279510 A1   Sep. 4, 2025

Related U.S. Application Data

(63) Continuation of application No. PCT/CN2024/074735, filed on Jan. 30, 2024.

(30) Foreign Application Priority Data

Apr. 13, 2023 (CN) .......................... 202310395020.2

(51) Int. Cl.
    *H01M 50/103*   (2021.01)
    *H01M 50/15*    (2021.01)
    (Continued)

(52) U.S. Cl.
    CPC ........ *H01M 50/103* (2021.01); *H01M 50/15* (2021.01); *H01M 50/176* (2021.01); *H01M 50/186* (2021.01)

(58) Field of Classification Search
    CPC ............ H01M 50/103; H01M 50/186; H01M 50/176; H01M 50/15
    See application file for complete search history.

(56) References Cited

U.S. PATENT DOCUMENTS

2021/0043901 A1   2/2021   Li et al.

FOREIGN PATENT DOCUMENTS

| CN | 112072058 A | * | 12/2020 | .......... H01M 10/058 |
| CN | 217719782 U |   | 11/2022 | |

(Continued)

OTHER PUBLICATIONS

CN 112072058 English Translation (Year: 2020).*

(Continued)

*Primary Examiner* — Jimmy Vo
(74) *Attorney, Agent, or Firm* — K&L Gates LLP

(57) ABSTRACT

A battery cell is disclosed, including a housing, electrode terminals, and a protective member. The housing includes a wall portion and a fastener, where the fastener comprises a connecting portion and a pressing portion that together define a cavity. At least part of the electrode terminals is positioned within the cavity. The protective member includes a first protective portion covering the connecting portion and a second protective portion covering the pressing portion. The second protective portion extends beyond the pressing portion in a first direction. The structure reduces the likelihood of short circuits by shielding the pressing portion, thereby enhancing battery cell reliability.

23 Claims, 9 Drawing Sheets

(51) Int. Cl.
*H01M 50/176* (2021.01)
*H01M 50/186* (2021.01)

(56) References Cited

FOREIGN PATENT DOCUMENTS

| CN | 217768552 U | 11/2022 |
|----|-------------|---------|
| CN | 217768702 U | 11/2022 |
| CN | 218602681 U | 3/2023  |
| CN | 219937332 U | 10/2023 |

OTHER PUBLICATIONS

The International Search Report received in the counterpart PCT application PCT/CN2024/07 4735, mailed on Apr. 10, 2024, 6 pages with English translation.
The Written Opinion of ISA received in the counterpart PCT application PCT/CN2024/07 4735, mailed on Apr. 10, 2024, 10 pages with English translation.

* cited by examiner

BATTERY CELL COMPRISING PROTECTIVE MEMBER FOR PREVENTING SHORT CIRCUIT, BATTERY COMPRISING THE BATTERY CELL, AND ELECTRIC APPARATUS COMPRISING THE BATTERY

CROSS-REFERENCE TO RELATED APPLICATIONS

This application is a continuation of PCT Application No. PCT/CN2024/074735, filed on Jan. 30, 2024, which claims priority to Chinese Patent Application No. 202310395020.2, filed on Apr. 13, 2023 and entitled "BATTERY CELL, BATTERY, AND ELECTRIC APPARATUS", which is incorporated herein by reference in its entirety.

TECHNICAL FIELD

This application relates to the field of battery technology, and in particular to, a battery cell, a battery, and an electric apparatus.

BACKGROUND

As the smallest unit constituting a battery, a battery cell typically includes an electrode assembly, a housing, and electrode terminals, where the electrode assembly is disposed within the housing and electrically connected to the electrode terminals for electric energy output or input of the battery cell. A wall portion of the housing is usually provided with a fastener, and the electrode terminals are fixed on the wall portion of the housing under the pressing action of a pressing portion of the fastener. However, in practical use, a distance between the pressing portion and exposed portions of the electrode terminals is small and metal burrs on the pressing portion or external metal wires are likely to bridge between the pressing portion and the exposed portions of the electrode terminals. Therefore, a short-circuit fault may be caused in the battery cell, reducing the reliability of the battery cell.

SUMMARY

One objective of the embodiments of this application is to provide a battery cell, a battery, and an electric apparatus, so as to solve the technical problem of low reliability of the battery cell caused by metal burrs on the pressing portion or external metal wires that tend to bridge between the pressing portion and exposed portions of the electrode terminals.

To solve the foregoing technical problem, the embodiments of this application propose the following technical solution.

According to a first aspect, a battery cell is provided, including an electrode assembly, a housing, electrode terminals, an insulator, and a protective member. The housing is configured to accommodate the electrode assembly, where the housing includes a wall portion and a fastener, the fastener includes a connecting portion connected to the wall portion and a pressing portion connected to the connecting portion, and the connecting portion and the pressing portion jointly define a cavity. The electrode terminals are electrically connected to the electrode assembly, and at least a portion of the electrode terminals is accommodated in the cavity. The insulator is disposed between the fastener and the electrode terminals, where the pressing portion presses against the electrode terminals through the insulator to fix the electrode terminals on the wall portion. The protective member includes a first protective portion and a second protective portion connected to each other, where the first protective portion covers the connecting portion, the second protective portion covers the pressing portion, the second protective portion protrudes beyond the pressing portion along a first direction, and the first direction is a direction pointing from the pressing portion to the electrode terminals and perpendicular to a thickness direction of the wall portion.

A beneficial effect of the battery cell provided in the embodiments of this application is that: the battery cell provided in the embodiments of this application effectively shields the pressing portion by means of having the second protective portion protrude beyond the pressing portion along the first direction. This reduces the risk that metal burrs on the pressing portion extend outward or external metal wires have contact with the pressing portion, so that metal burrs on the pressing portion or external metal wires are less likely to bridge between the pressing portion and exposed portions of the electrode terminals, reducing the risk of a short-circuit fault in the battery cell and effectively enhancing the reliability of the battery cell.

In some embodiments of this application, the insulator includes a first insulating portion, and along the first direction, the first insulating portion is disposed between the pressing portion and the electrode terminals.

In this technical solution, the first insulating portion insulates and separates the pressing portion and the electrode terminals along the first direction, further reducing the risk that metal burrs on the pressing portion or external metal wires bridge between the pressing portion and exposed portions of the electrode terminals. This further reduces the risk of a short-circuit fault in the battery cell and further enhances the reliability of the battery cell.

In some embodiments of this application, at least a portion of a projection of the second protective portion in the thickness direction of the wall portion overlaps with a projection of the first insulating portion in the thickness direction of the wall portion.

In this technical solution, at least a portion of the second protective portion covers the first insulating portion. In this way, the pressing portion and the electrode terminals are insulated and separated more reliably, further reducing the risk that metal burrs on the pressing portion or external metal wires bridge between the pressing portion and exposed portions of the electrode terminals. This further reduces the risk of a short-circuit fault in the battery cell and enhances the reliability of the battery cell.

In some embodiments of this application, the second protective portion is fixedly connected to the first insulating portion.

In this technical solution, under the cooperative action of the second protective portion and the first insulating portion, the pressing portion and the electrode terminals are fully separated, further reducing the risk that metal burrs on the pressing portion or external metal wires bridge between the pressing portion and exposed portions of the electrode terminals. This further reduces the risk of a short-circuit fault in the battery cell and enhances the reliability of the battery cell.

In some embodiments of this application, in the thickness direction of the wall portion, an end surface of the first insulating portion facing away from the electrode assembly is flush with a surface of the pressing portion facing away from the electrode assembly, and the second protective portion is fixedly connected to the end surface of the first insulating portion.

In this technical solution, the second protective portion and the first insulating portion can be easily connected and connection stress between the second protective portion and the first insulating portion is reduced, so that the second protective portion less likely to detach from the first insulating portion.

In some embodiments of this application, in the thickness direction of the wall portion, at least a portion of the first insulating portion protrudes beyond the surface of the pressing portion facing away from the electrode assembly.

In this technical solution, the first insulating portion insulates and separates the pressing portion and the electrode terminals more reliably, further reducing the risk that metal burrs on the pressing portion or external metal wires bridge between the pressing portion and exposed portions of the electrode terminals. This further reduces the risk of a short-circuit fault in the battery cell and enhances the reliability of the battery cell.

In some embodiments of this application, the insulator further includes a second insulating portion connected to an end of the first insulating portion facing the electrode assembly, and along the first direction, the second insulating portion is disposed between the connecting portion and the electrode terminals.

In this technical solution, the second insulating portion insulates and separates the connecting portion and the electrode terminals, thereby further reducing the risk of a short-circuit fault in the battery cell and enhancing the reliability of the battery cell.

In some embodiments of this application, the second insulating portion includes a first insulating segment, a second insulating segment, and a third insulating segment, where the first insulating segment is connected to the first insulating portion, the first insulating segment, the second insulating segment, and the third insulating segment enclose a cladding cavity, and at least a portion of the electrode terminals is disposed within the cladding cavity.

In this technical solution, the connecting portion and the electrode terminals are effectively insulated and separated, thereby further reducing the risk of a short-circuit fault in the battery cell and enhancing the reliability of the battery cell.

In some embodiments of this application, the second protective portion includes a cover body and a flange, where one side of the cover body along the first direction is connected to the first protective portion, the other side of the cover body along the first direction is connected to the flange, and in the thickness direction of the wall portion, the cover body covers the pressing portion and the flange covers a side of the pressing portion facing the electrode terminals along the first direction.

In this technical solution, the flange separates the pressing portion and the electrode terminals along the first direction, further reducing the risk that metal burrs on the pressing portion or external metal wires bridge between the pressing portion and exposed portions of the electrode terminals. This further reduces the risk of a short-circuit fault in the battery cell and enhances the reliability of the battery cell.

In some embodiments of this application, the insulator includes a first insulating portion, where the first insulating portion is disposed between the pressing portion and the electrode terminals along the first direction, a gap is formed between the first insulating portion and the pressing portion, and at least a portion of the flange is accommodated in the gap.

In this technical solution, the flange and the first insulating portion jointly insulate and separate the pressing portion and the electrode terminals along the first direction, further reducing the risk that metal burrs on the pressing portion or external metal wires bridge between the pressing portion and exposed portions of the electrode terminals. In addition, the flange is restricted within the gap to reduce the risk of the flange detaching from a position between the pressing portion and the electrode terminals, thereby further reducing the risk of a short-circuit fault in the battery cell and enhancing the reliability of the battery cell.

In some embodiments of this application, a length of the portion of the flange accommodated in the gap is greater than a minimum width of the gap.

In this technical solution, the flipping range of the flange within the gap is restricted to a certain extent, thereby reducing the risk of the flange flipping out of the gap.

In some embodiments of this application, a thickness of the flange is less than a width of the gap.

In this technical solution, the flange can be easily inserted into the gap.

In some embodiments of this application, the flange is fixedly connected to the side of the pressing portion facing the electrode terminals along the first direction.

In this technical solution, the relative positions of the flange and the pressing portion are kept unchanged, so that the flange separates the pressing portion and the electrode terminals along the first direction, further reducing the risk that metal burrs on the pressing portion or external metal wires bridge between the pressing portion and exposed portions of the electrode terminals. This further reduces the risk of a short-circuit fault in the battery cell and enhances the reliability of the battery cell.

In some embodiments of this application, a cross-section of the side of the pressing portion facing the electrode terminals along the first direction is an arcuate structure in the thickness direction of the wall portion.

In this technical solution, an area of connection between the flange and the pressing portion is effectively increased to enhance connection strength between the flange and the pressing portion and control the lifting of the flange, thereby maintaining the relative positions of the flange and the pressing portion more effectively.

In some embodiments of this application, a side of a joint between the first protective portion and the second protective portion facing the fastener has a first fillet structure.

In this technical solution, connection stress between the first protective portion and the second protective portion is effectively reduced so that the second protective portion is less likely to detach from the pressing portion due to lifting, thereby further reducing the risk of a short-circuit fault in the battery cell and enhancing the reliability of the battery cell.

In some embodiments of this application, a side of a joint between the connecting portion and the pressing portion facing the first fillet structure has a second fillet structure.

In this technical solution, connection stress between the connecting portion and the pressing portion is effectively reduced to control the risk of fracture of the connecting portion and the pressing portion, further enhancing the reliability of the battery cell.

In some embodiments of this application, a radius of the first fillet structure is less than or equal to a radius of the second fillet structure.

In this technical solution, the joint between the first protective portion and the second protective portion less interferes with the joint between the connecting portion and the pressing portion, so that the second protective portion is less likely to detach from the pressing portion due to lifting. This further reduces the risk of a short-circuit fault in the battery cell and enhances the reliability of the battery cell.

In some embodiments of this application, a side of a joint between the connecting portion and the pressing portion facing the first fillet structure has a first chamfered structure.

In this technical solution, the fastener can be easily bent and processed. After the first chamfered structure is formed, part of the material of the pressing portion displaces toward the electrode terminals, effectively increasing a downward pressure exerted by the pressing portion on the insulator. In this way, the electrode terminals can be fixed more firmly on the wall portion of the housing.

In some embodiments of this application, a projection of the first chamfered structure in the thickness direction of the wall portion has a first width, and a projection of the first chamfered structure in the first direction has a second width; where the radius of the first fillet structure is less than or equal to the first width, and the radius of the first fillet structure is less than or equal to the second width.

In this technical solution, the joint between the first protective portion and the second protective portion less interferes with the joint between the connecting portion and the pressing portion, so that the second protective portion less likely to detach from the pressing portion due to lifting. This further reduces the risk of a short-circuit fault in the battery cell and enhances the reliability of the battery cell.

In some embodiments of this application, a side of a joint between the connecting portion and the pressing portion facing the protective member has a first chamfered structure, and a side of a joint between the first protective portion and the second protective portion facing the first chamfered structure has a second chamfered structure; where a projection of the first chamfered structure in the thickness direction of the wall portion has a first width, a projection of the first chamfered structure in the first direction has a second width; a projection of the second chamfered structure in the thickness direction of the wall portion has a third width, a projection of the second chamfered structure in the first direction has a fourth width; and the third width is less than or equal to the first width, and the fourth width is less than or equal to the second width.

In this technical solution, the joint between the first protective portion and the second protective portion less interferes with the joint between the connecting portion and the pressing portion, so that the second protective portion less likely to detach from the pressing portion due to lifting. This further reduces the risk of a short-circuit fault in the battery cell and enhances the reliability of the battery cell.

In some embodiments of this application, the wall portion is provided with a first through hole, the electrode terminals are disposed in the first through hole and electrically connected to the electrode assembly, the first protective portion and the connecting portion each have an annular structure, the connecting portion is annularly disposed around the first through hole, the first protective portion is annularly disposed around the connecting portion, and an inner diameter of the first protective portion is greater than or equal to an outer diameter of the connecting portion.

In this technical solution, interference between the first protective portion and the connecting portion is reduced to lower the possibility of the second protective portion being lifted due to lifting of the first protective portion. This effectively reduces the risk of the second protective portion detaching from the pressing portion, thereby further reducing the risk of a short-circuit fault in the battery cell and enhancing the reliability of the battery cell.

In some embodiments of this application, the protective member further includes a third protective portion covering the wall portion, the third protective portion is connected to the first protective portion, and a side of a joint between the third protective portion and the first protective portion facing the fastener has a third fillet structure.

In this technical solution, connection stress between the third protective portion and the first protective portion is effectively reduced to lower the possibility of the second protective portion being lifted due to lifting of the first protective portion. This effectively reduces the risk of the second protective portion detaching from the pressing portion, thereby further reducing the risk of a short-circuit fault in the battery cell and enhancing the reliability of the battery cell.

In some embodiments of this application, a side of a joint between the connecting portion and the wall portion facing the third fillet structure has a fourth fillet structure.

In this technical solution, connection stress between the connecting portion and the wall portion is effectively reduced to control the risk of fracture of the connecting portion and the wall portion, further enhancing the reliability of the battery cell.

In some embodiments of this application, a radius of the third fillet structure is greater than or equal to a radius of the fourth fillet structure.

In this technical solution, the joint between the first protective portion and the third protective portion less interferes with the joint between the connecting portion and the wall portion, lowering the possibility of the second protective portion being lifted due to lifting of the first protective portion. This effectively reduces the risk of the second protective portion detaching from the pressing portion, thereby further reducing the risk of a short-circuit fault in the battery cell and enhancing the reliability of the battery cell.

In some embodiments of this application, the first protective portion, the second protective portion, and the third protective portion are integrally formed.

In this technical solution, the manufacturing process of the protective member is effectively simplified, thereby improving manufacturing efficiency of the protective member and reducing manufacturing costs of the protective member.

In some embodiments of this application, the pressing portion has an annular structure and is annularly disposed around the electrode terminals.

In this technical solution, the pressing portion is less likely to flip outward, so that the electrode terminals can be fixed more firmly on the wall portion of the housing.

In some embodiments of this application, the battery cell further includes a sealing member, and at least a portion of the sealing member is located between the wall portion and the electrode terminals.

In this technical solution, the sealing member seals a gap between the wall portion and the electrode terminals, reducing the risk of electrolyte leakage from between the electrode terminals and the body within the housing. This helps enhance the reliability of the battery cell.

In some embodiments of this application, the housing includes a housing body and an end cap, where one end of the housing body has an opening, the end cap covers the opening, the housing body includes a side wall and a bottom wall, the side wall is annularly disposed outside the electrode assembly, the bottom wall is disposed opposite the opening, and the wall portion is the end cap, the bottom wall, or the side wall.

In this technical solution, the electrode terminals can be installed on the end cap, the bottom wall, or the side wall.

According to a second aspect, an embodiment of this application further provides a battery, including the foregoing battery cell.

A beneficial effect of the battery provided in the embodiment of this application is that: with the foregoing battery cell adopted, the battery provided in the embodiment of this application has higher reliability.

According to a third aspect, an embodiment of this application further provides an electric apparatus, including the foregoing battery.

A beneficial effect of the electric apparatus provided in the embodiment of this application is that: with the foregoing battery adopted, the electric apparatus provided in the embodiment of this application has higher reliability.

DESCRIPTION OF DRAWINGS

To illustrate the technical solutions in the embodiments of this application more clearly, the drawings required in the description of the embodiments or the prior art are briefly described below. Obviously, the drawings described below are merely some embodiments of this application, and for those of ordinary skill in the art, other drawings may be obtained based on these drawings without creative effort.

REFERENCE SIGNS

Figure 1:
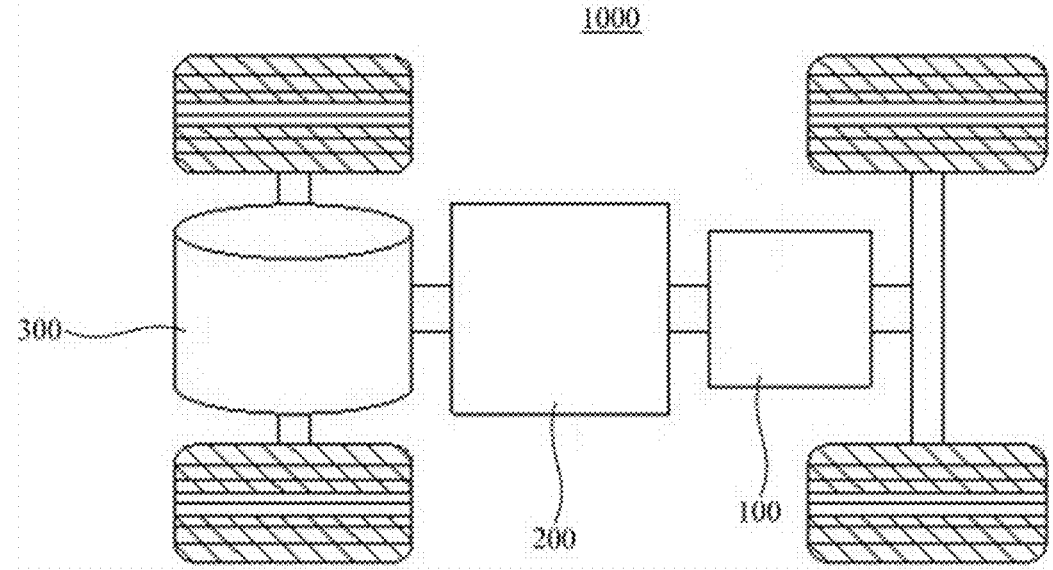
FIG. 1 is a schematic structural diagram of a vehicle according to an embodiment of this application.

1000. vehicle;
100. battery;
10. box; 11. first portion; 12. second portion; 13. accommodating space;
20. battery cell; 21. protective member; 211. first protective portion; 212. second protective portion; 2121. cover body; 2122. flange; 2123. second through hole; 213. third protective portion; 214. first fillet structure; 215. second chamfered structure; 216. third fillet structure; 22. housing; 221. housing body; 222. end cap; 2221. first through hole; 223. fastener; 2231. connecting portion; 2232. pressing portion; 2233. second fillet structure; 2234. first chamfered structure; 224. fourth fillet structure; 23. electrode terminal; 231. first connecting segment; 232. second connecting segment; 233. flange portion; 24. electrode assembly; 25. insulator; 251. first insulating portion; 252. second insulating portion; 2521. first insulating segment; 2522. second insulating segment; 2523. third insulating segment; 26. sealing member; 27. gap; 28. pressure relief mechanism;
200. controller; and
300. motor.

DESCRIPTION OF EMBODIMENTS

To make the technical problems, technical solutions, and beneficial effects to be solved by this application clearer, this application is further described in detail below in conjunction with the drawings and embodiments. It should be understood that the specific embodiments described herein are merely used to explain this application but are not intended to limit this application.

It should be noted that when an element is referred to as being "fixed to" or "disposed on" another element, the element may be directly on the other element or indirectly on the other element. When an element is referred to as being "connected to" another element, the element may be directly connected to the another element or indirectly connected to the another element.

It should be understood that the terms "length", "width", "upper", "lower", "front", "rear", "left", "right", "vertical", "horizontal", "top", "bottom", "inner", "outer", and similar terms indicating orientation or positional relationships are based on the orientation or positional relationships shown in the drawings, and are merely for convenience of describing this application and simplifying the description, rather than indicating or implying that the device or element referred to must have a specific orientation, be constructed and operated in a specific orientation, and thus should not be construed as limiting this application.

In addition, the terms "first" and "second" are used for description purposes only and should not be understood as indicating or implying relative importance or implicitly specifying the number of technical features indicated. Therefore, a feature defined with "first" or "second" may explicitly or implicitly include one or more of that feature. In the description of this application, "a plurality" means two or at least two unless otherwise specifically stated.

As the smallest unit constituting a battery, a battery cell typically includes an electrode assembly, a housing, and electrode terminals. The housing is a component configured to provide an internal environment of the battery cell, the electrode assembly is accommodated in the internal environment of the battery cell, and the electrode terminals are fixed on a wall portion of the housing and electrically connected to the electrode assembly for electric energy output or input of the battery cell. In practical use, to ensure that the electrode terminals are mounted stably, a fastener is usually provided on the wall portion of the housing to fix the electrode terminals. Specifically, a connecting portion of the fastener is connected to the wall portion of the housing, and a pressing portion of the fastener is connected to the connecting portion and provides a downward pressure to the electrode terminals, so that the electrode terminals is fixed on the wall portion of the housing.

In related technologies, for ease of connection between the electrode terminals and external electrical connectors, at least a portion of the electrode terminals needs to be exposed to an external environment of the battery cell. Due to the small distance between the pressing portion and exposed portions of the electrode terminals, a short-circuit easily occurs between the pressing portion and the electrode terminals. For example, when metal burrs are present on the pressing portion, the metal burrs is likely to extend toward the exposed portions of the electrode terminals and bridge between the pressing portion and the exposed portions of the electrode terminals, short-circuiting the pressing portion and the electrode terminals. Alternatively, when an external metal wire falls between the pressing portion and the electrode terminals, the metal wire bridges between the pressing portion and the exposed portions of the electrode terminals, short-circuiting the pressing portion and the electrode terminals. In these cases, a short-circuit fault occurs in the battery cell, reducing the reliability of the battery cell.

To reduce the risk of a short-circuit fault in the battery cell, an embodiment of this application provides a battery cell, where the battery cell includes a housing, electrode terminals, and a protective member. A wall portion of the housing is provided with a fastener, the electrode terminals are accommodated in a cavity of the fastener, a pressing portion of the fastener provides a downward pressure to the electrode terminals to fix the electrode terminals on the wall portion of the housing, and along a direction pointing from the pressing portion to the electrode terminals and perpendicular to a thickness direction of the wall portion, a second protective body of the protective member protrudes beyond a side of the pressing portion facing the electrode terminals to shield the pressing portion, reducing the risk that metal burrs on the pressing portion extend outward or external metal wires have contact with the pressing portion. In this way, metal burrs on the pressing portion or external metal wires are less likely to bridge between the pressing portion and exposed portions of the electrode terminals, thereby effectively reducing the risk of a short-circuit fault in the battery cell and effectively enhancing the reliability of the battery cell.

The embodiments of this application disclose a battery cell, a battery, and an electric apparatus using the battery as a power source. The electric apparatus may include, but is not limited to, a vehicle, a mobile phone, a portable device, a laptop computer, a ship, a spacecraft, an electric toy, an electric tool, and the like. The vehicle may be a fuel vehicle, a gas vehicle, or a new energy vehicle, where the new energy vehicle may be a pure electric vehicle, a hybrid vehicle, an extended-range vehicle, or the like. The spacecraft includes an airplane, a rocket, a space shuttle, a spaceship, and the like. The electric toy includes a stationary or mobile electric toy, such as a gaming console, an electric car toy, an electric ship toy, an electric airplane toy, and the like. The electric tool includes a metal cutting electric tool, a grinding electric tool, an assembly electric tool, and a railway electric tool, such as an electric drill, an electric grinder, an electric wrench, an electric screwdriver, an electric hammer, an impact drill, a concrete vibrator, an electric planer, and the like.

For ease of description, the electric apparatus according to an embodiment of this application being a vehicle is used as an example for description of the following embodiments.

Referring to FIG. 1, FIG. 1 is a schematic structural diagram of a vehicle 1000 according to an embodiment of this application. The vehicle 1000 may be a fuel vehicle, a gas vehicle, or a new energy vehicle, where the new energy vehicle may be a pure electric vehicle, a hybrid vehicle, an extended-range vehicle, or the like. A battery 100 is provided inside the vehicle 1000, and the battery 100 may be disposed at the bottom, front, or rear of the vehicle 1000. The battery 100 may be used for power supply of the vehicle 1000, for example, the battery 100 may serve as an operational power source of the vehicle 1000. The vehicle 1000 may further include a controller 200 and a motor 300, where the controller 200 is configured to control the battery 100 to supply power to the motor 300, for example, for operational power requirements during starting, navigation, and driving of the vehicle 1000.

In some embodiments of this application, the battery 100 may be used not only as the operational power source for the vehicle 1000 but also a driving power source for the vehicle 1000, replacing or partially replacing fossil fuel or natural gas to provide driving traction for the vehicle 1000.

Figure 2:
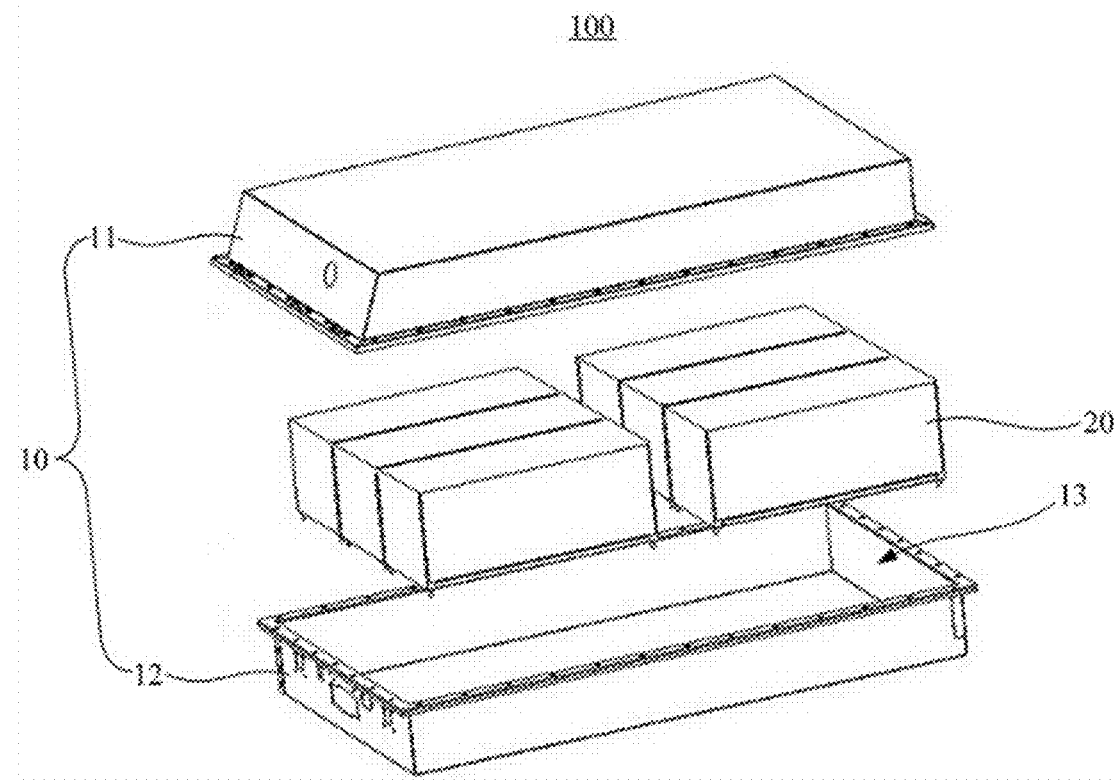
FIG. 2 is a schematic exploded view of a battery according to an embodiment of this application.

Referring to FIG. 2, FIG. 2 is a schematic exploded view of a battery 100 according to an embodiment of this application. The battery 100 includes a box 10 and a battery cell 20, where the battery cell 20 is accommodated in the box 10. The box 10 is configured to provide an accommodating space 13 for the battery cell 20. The box 10 may have various structures. In some embodiments, the box 10 may include a first portion 11 and a second portion 12. The first portion 11 and the second portion 12 fit together so that the first portion 11 and the second portion 12 jointly define an accommodating space 13 for accommodating the battery cells 20. The second portion 12 may be a hollow structure with an opening at one end, the first portion 11 may be a plate-shaped structure, and the first portion 11 covers the opening side of the second portion 12 so that the first portion 11 and the second portion 12 jointly define the accommodating space 13. Alternatively, both the first portion 11 and the second portion 12 may be hollow structures with an opening at one side, and the opening side of the first portion 11 is engaged with the opening side of the second portion 12. Certainly, the box 10 formed by the first portion 11 and the second portion 12 may be of various shapes, for example, cylinder or cuboid.

In some embodiments, the box 10 may be a part of a chassis structure of the vehicle 1000. For example, a portion of the box 10 may be at least a part of a floor of the vehicle 1000, or a portion of the box 10 may be at least a part of cross beams and longitudinal beams of the vehicle 1000.

In the battery 100, the battery cell 20 may be provided in plurality, and the plurality of battery cells 20 may be connected in series, in parallel, or in series-parallel, where a series-parallel connection refers to a combination of series and parallel connections among the plurality of battery cells 20. The plurality of battery cells 20 may be directly connected in series, in parallel, or in series-parallel, and then an entirety of the plurality of battery cells 20 is accommodated in the box 10. Alternatively, the battery 100 may also be formed by first connecting a plurality of battery cells 20 in series, in parallel, or in series-parallel to form battery modules, and then connecting a plurality of battery modules in series, in parallel, or in series-parallel to form an entirety, which is accommodated in the box 10. The battery 100 may also include other functional components, for example, the battery 100 may further include a busbar component configured to achieve electrical connection between the plurality of battery cells 20.

Each battery cell 20 may be a secondary battery or a primary battery, where the secondary battery refers to a battery cell 20 that can be recharged to activate active materials for continued use after discharge, and the primary battery refers to a battery cell 20 that cannot be recharged to activate active materials for continued use after its electric energy is depleted; the battery cell 20 may also be a lithium-ion battery, a sodium-ion battery, a sodium-lithium-ion battery, a lithium metal battery, a sodium metal battery, a lithium-sulfur battery, a magnesium-ion battery, a nickel-hydrogen battery, a nickel-cadmium battery, a lead-acid battery, or the like, but is not limited thereto. The battery cell 20 may be a cylindrical battery cell, a prismatic battery cell, a pouch battery cell, or a battery cell of other shapes, where the prismatic battery cell includes a square-housing body battery cell, a blade-shaped battery cell, a polygonal prismatic battery, such as a hexagonal prismatic battery, and the like, with no particular limitation in this application.

Alternatively, in some embodiments, the battery 100 may not include the box 10, but instead, a plurality of battery cells 20 are electrically connected and assembled into an entirety through necessary fixing structures before being mounted into the vehicle 1000.

Figure 3:
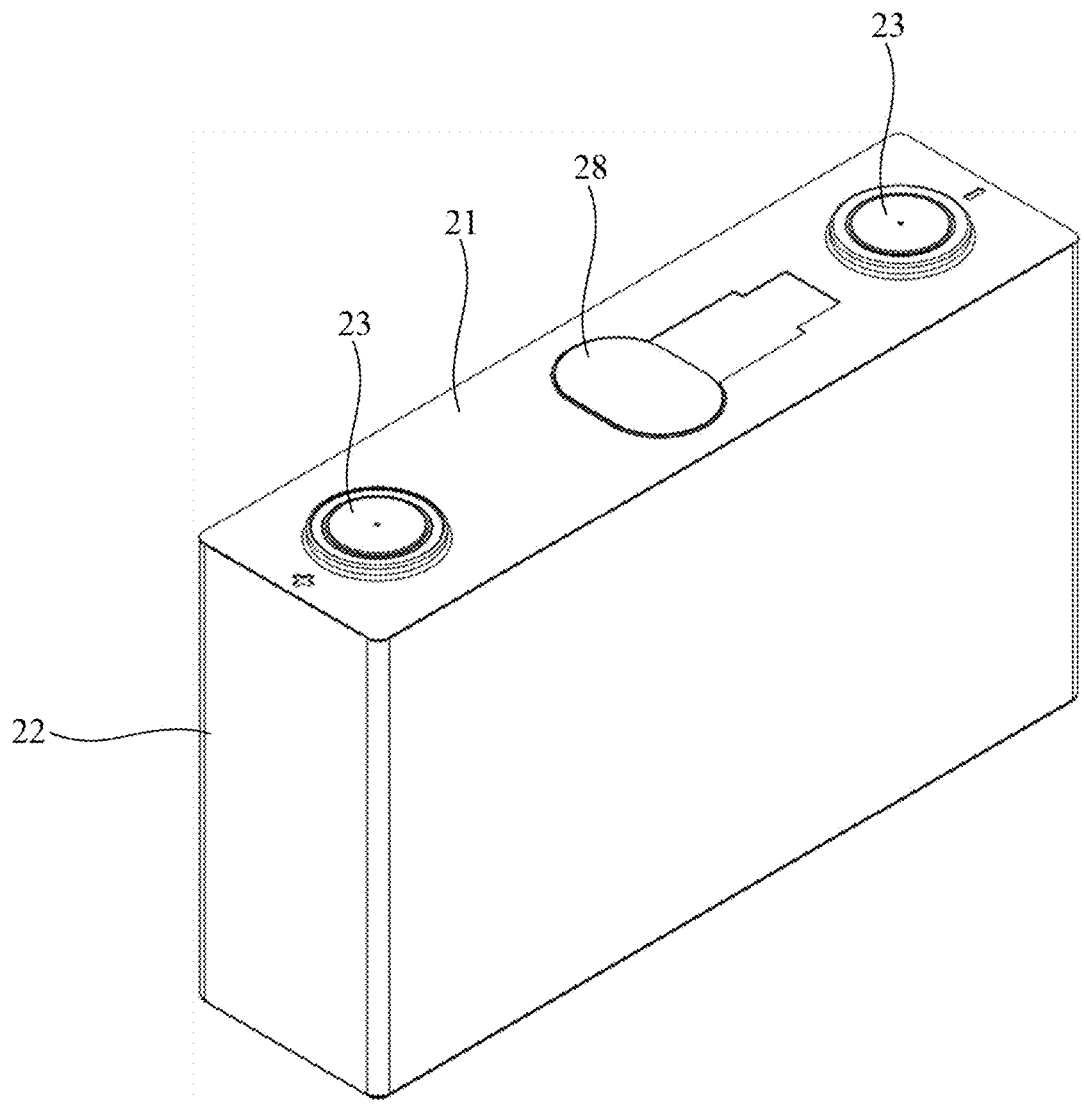
FIG. 3 is a schematic structural diagram of a battery cell according to an embodiment of this application.
Figure 4:
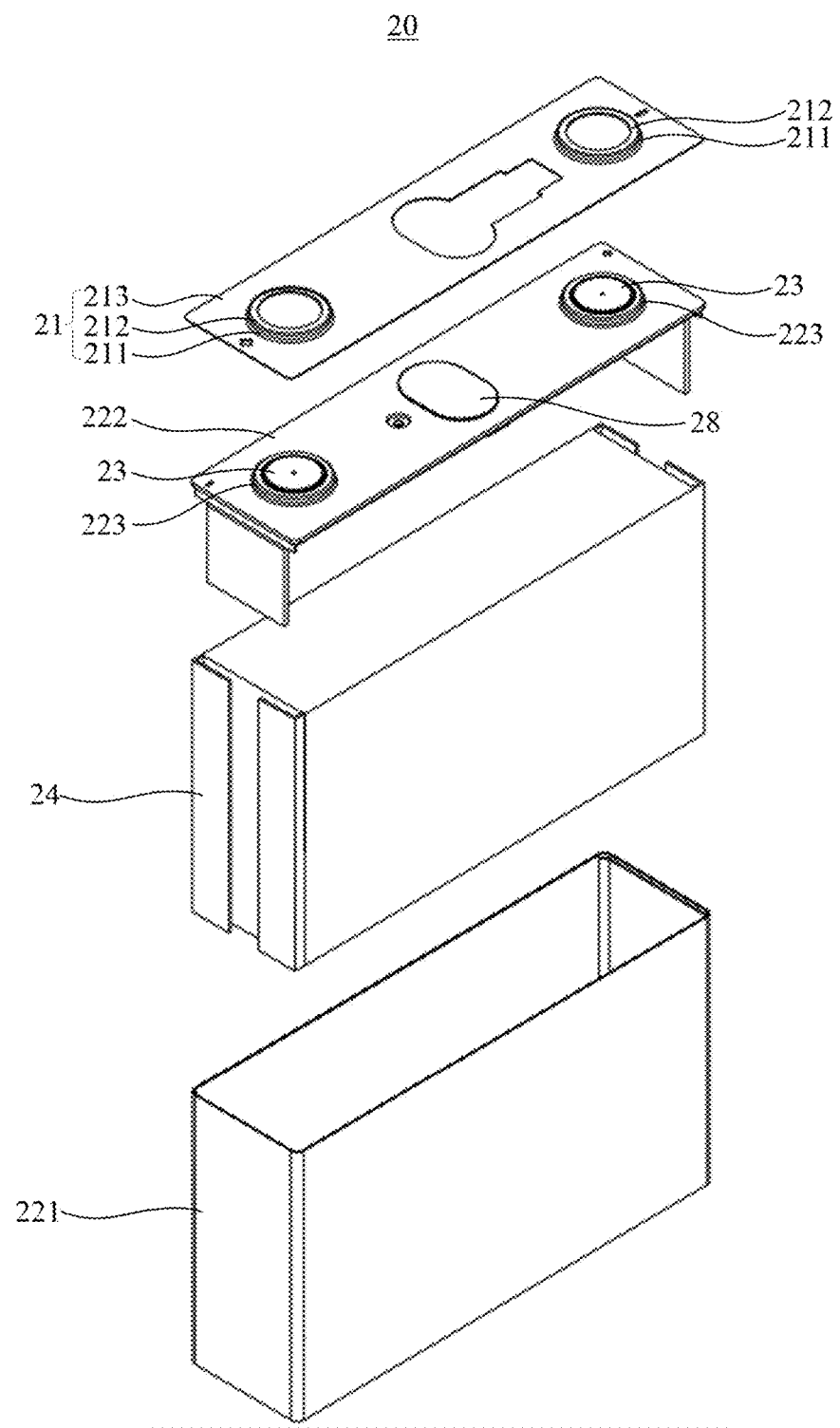
FIG. 4 is a schematic exploded view of the battery cell shown in FIG. 3.
Figure 5:
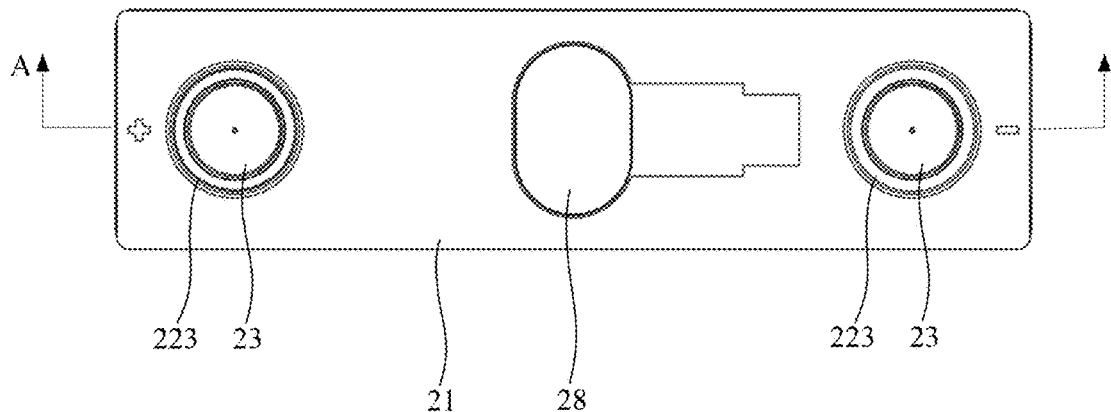
FIG. 5 is a top view of the battery cell shown in FIG. 4.
Figure 6:
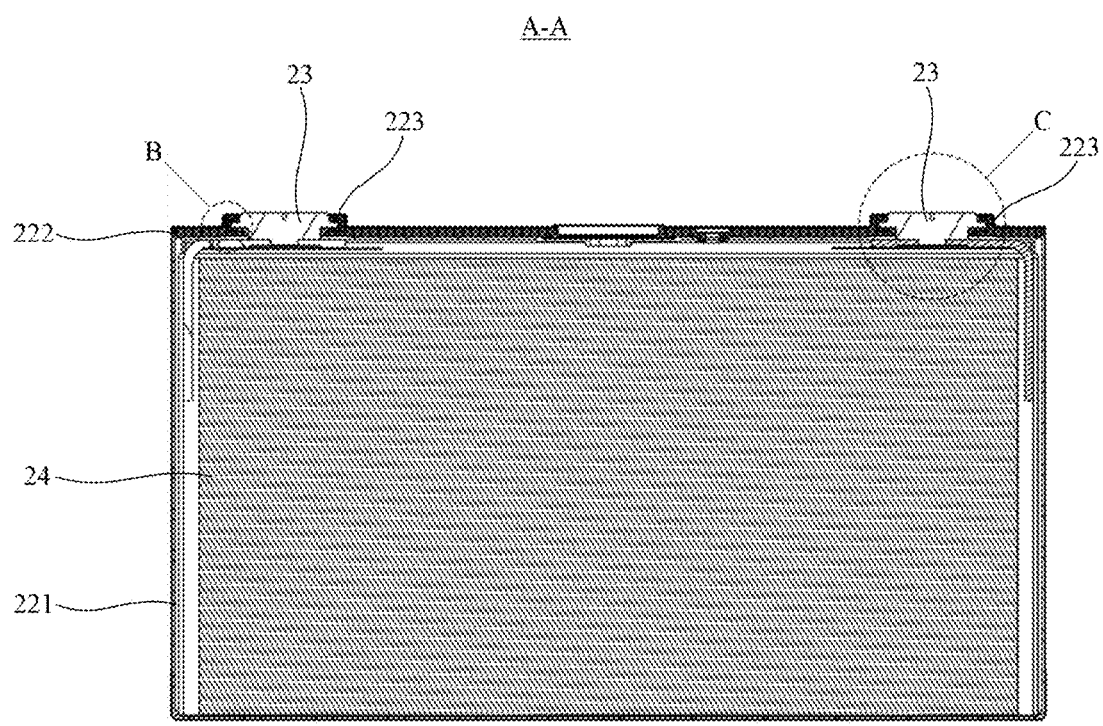
FIG. 6 is a cross-sectional view of the battery cell shown in FIG. 5 along the A-A line direction.

Referring to FIG. 3 and FIG. 4, FIG. 3 is a schematic structural diagram of a battery cell 20 according to an embodiment of this application, and FIG. 4 is a schematic exploded view of the battery cell 20 shown in FIG. 3. The battery cell 20 refers to the smallest unit constituting the battery 100. The battery cell 20 provided in the embodiments of this application includes a housing 22, an electrode assembly 24, electrode terminals 23, an insulator 25, and other functional components.

The housing 22 includes a housing body 221 and an end cap 222, where the housing body 221 is a component configured to provide an internal environment of the battery cell 20, and the internal environment can be used to accommodate the electrode assembly 24 and other functional components. The housing body 221 may be an independent component, and an opening may be provided on the housing body 221, where the end cap 222 is disposed over the opening to form the internal environment of the battery cell 20, and components such as the electrode assembly 24 are accommodated in the internal environment. Specifically, the housing body 221 and the end cap 222 may form a common connection surface before other components are placed into the housing body, and when the interior of the housing body 221 needs to be encapsulated, the end cap 222 is disposed over the opening of the housing body 221. Optionally, the housing body 221 may have various shapes and sizes, such as a cuboid shape, a cylindrical shape, and a hexagonal prism shape. Specifically, the shape of the housing body 221 may be determined based on the specific shape and size of the electrode assembly 24. The housing body 221 may be made of various materials, such as copper, iron, aluminum, stainless steel, aluminum alloy, or the like, with no specific limitation herein.

The end cap 222 refers to a component that covers the opening of the housing body 221 to isolate the internal environment of the battery cell 20 from an external environment. The shape of the end cap 222 may be adapted to the shape of the housing body 221 to fit with the housing body 221. In some embodiments, the end cap 222 may be made of a material with certain hardness and strength, so that the end cap 222 is not easily deformed when subjected to compression or collision, enabling the battery cell 20 to have higher structural strength and improved safety performance. Certainly, the material of the end cap 222 is not uniquely limited in this embodiment, and the end cap 222 may be made of materials such as copper, iron, aluminum, stainless steel, aluminum alloy, plastic, or the like. In some embodiments, the end cap 222 may also be provided with a pressure relief mechanism 28 configured to release internal pressure when the internal pressure or temperature of the battery cell 20 reaches a threshold. In some embodiments, an insulating separator may also be provided on the end cap 222, where the insulating separator can be used to isolate electrical connection components within the housing body 221 from the end cap 222 to reduce the risk of a short circuit. Optionally, the material of the insulating separator may include, but is not limited to, plastic, rubber, or the like.

The electrode assembly 24 is a component in the battery cell 20 where an electrochemical reaction occurs. The battery cell 20 may include one or more electrode assemblies 24. The electrode assembly 24 is primarily formed by winding or stacking a positive electrode plate, a negative electrode plate, and a separator.

In some embodiments, the electrode assembly 24 has a wound structure. The positive electrode plate and the negative electrode plate are formed into a wound structure.

In some embodiments, the electrode assembly 24 has a laminated structure.

As an example, a plurality of positive electrode plates and a plurality of negative electrode plates may be provided, where the plurality of positive electrode plates and the plurality of negative electrode plates are alternately stacked.

As an example, a plurality of positive electrode plates may be provided, and the negative electrode plate is folded to form a plurality of stacked folding segments, with one positive electrode plate sandwiched between adjacent folding segments.

As an example, both the positive electrode plate and the negative electrode plate are folded to form a plurality of stacked folding segments.

As an example, a plurality of separators may be provided, each disposed between any adjacent positive electrode plates or negative electrode plates.

As an example, the separator may be continuously provided, and disposed between any adjacent positive electrode plates or negative electrode plates by means of folding or winding.

During charging and discharging of the battery cell 20, active ions (for example, lithium ions) intercalate and deintercalate back and forth between the positive electrode plate and the negative electrode plate. The separator is disposed between the positive electrode plate and the negative electrode plate to prevent a short circuit between the positive and negative electrodes while allowing the active ions to pass through.

The positive electrode plate may include a positive electrode current collector and a positive electrode active material disposed on at least one surface of the positive electrode current collector.

As an example, the positive electrode current collector has two opposite surfaces in a thickness direction of the positive electrode current collector, and the positive electrode active material is disposed on either or both of the two opposite surfaces of the positive electrode current collector.

As an example, the positive electrode current collector may be a metal foil current collector or a composite current collector. For example, the metal foil may use silver surface-treated aluminum or stainless steel, stainless steel, copper, aluminum, nickel, baked carbon, carbon, nickel, or titanium. The composite current collector may include a polymer material matrix and a metal layer. The composite current collector may be formed by forming a metal material (aluminum, aluminum alloy, nickel, nickel alloy, titanium, titanium alloy, silver, silver alloy, or the like) on a polymer material matrix (for example, a matrix of polypropylene, polyethylene terephthalate, polybutylene terephthalate, polystyrene, or polyethylene).

As an example, the positive electrode active material may include at least one of the following materials: lithium-containing phosphate, lithium transition metal oxide, and respective modified compounds thereof. However, this application is not limited to these materials, and other conventional materials that can be used as the positive electrode active material of the battery cell 20 may also be used. These positive electrode active materials may be used alone or in combination. Examples of the lithium-containing phosphate may include, but are not limited to, at least one of lithium iron phosphate (for example, LiFePO$_4$ (LFP for short)), a composite material of lithium iron phosphate and carbon, lithium manganese phosphate (for example, LiMnPO$_4$), a composite material of lithium manganese phosphate and carbon, lithium iron manganese phosphate, and a composite material of lithium iron manganese phosphate and carbon. Examples of the lithium transition metal oxide may include, but are not limited to, at least one of lithium cobalt oxide (for example, LiCoO$_2$), lithium nickel oxide (for example, LiNiO$_2$), lithium manganese oxide (for example, LiMnO$_2$, LiMn2O$_4$), lithium nickel cobalt oxide, lithium manganese cobalt oxide, lithium nickel manganese oxide, lithium nickel cobalt manganese oxide (for example, LiNi$_{1/3}$Co$_{1/3}$Mn$_{1/3}$O$_2$ (NCM333 for short), LiNi$_{0.5}$Co$_{0.2}$Mn$_{0.3}$O$_2$ (NCM523 for short), LiNi$_{0.5}$Co$_{0.25}$Mn$_{0.25}$O$_2$ (NCM211 for short), LiNi$_{0.6}$Co$_{0.2}$Mn$_{0.2}$O$_2$ (NCM622 for short), LiNi$_{0.8}$Co$_{0.1}$Mn$_{0.1}$O$_2$ (NCM811 for short)), lithium nickel cobalt aluminum oxide (for example, LiNi$_{0.85}$Co$_{0.15}$Al$_{0.05}$O$_2$), and modified compounds thereof.

In some embodiments, the positive electrode may use a foam metal. The foam metal may be foam nickel, foam copper, foam aluminum, foam alloy, or foam carbon, or the like. When the foam metal is used as the positive electrode, the surface of the foam metal may or may not be provided with the positive electrode active material. As an example, a lithium source material, potassium metal, or sodium metal may also be filled or deposited within the foam metal, where the lithium source material is lithium metal and/or a lithium-rich material.

The negative electrode plate may include a negative electrode current collector.

As an example, the negative electrode current collector may use a metal foil, a foam metal, or a composite current collector. For example, the metal foil may use silver surface-treated aluminum or stainless steel, stainless steel, copper, aluminum, nickel, baked carbon, carbon, nickel, or titanium. The foam metal may be foam nickel, foam copper, foam aluminum, foam alloy, or foam carbon, or the like. The composite current collector may include a polymer material matrix and a metal layer. The composite current collector may be formed by forming a metal material (copper, copper alloy, nickel, nickel alloy, titanium, titanium alloy, silver, silver alloy, or the like) on a polymer material matrix (for example, a matrix of polypropylene, polyethylene terephthalate, polybutylene terephthalate, polystyrene, polyethylene, or the like).

As an example, the negative electrode plate may include a negative electrode current collector and a negative electrode active material disposed on at least one surface of the negative electrode current collector.

As an example, the negative electrode current collector has two opposite surfaces in a thickness direction of the negative electrode current collector, and the negative electrode active material is disposed on either or both of the two opposite surfaces of the negative electrode current collector.

As an example, the negative electrode active material may use a negative electrode active material known in the art for the battery cell 20. For example, the negative electrode active material may include at least one of the following materials: artificial graphite, natural graphite, soft carbon, hard carbon, silicon-based material, tin-based material, and lithium titanate. The silicon-based material may be selected from at least one of elemental silicon, silicon-oxygen compound, silicon-carbon composite, silicon-nitrogen composite, or silicon alloy. The tin-based material may be selected from at least one of elemental tin, tin-oxygen compound, or tin alloy. However, this application is not limited to these materials, and other conventional materials that can be used as the negative electrode active material of the battery cell 20 may also be used. These negative electrode active materials may be used alone or in combination.

In some embodiments, the material of the positive electrode current collector may be aluminum, and the material of the negative electrode current collector may be copper.

In some embodiments, the separator is an isolating film. The separator is not limited to any particular type in this application, and may be any well-known porous separator with good chemical stability and mechanical stability.

As an example, a major material of the isolating film may be selected from at least one of glass fiber, non-woven fabric, polyethylene, polypropylene, polyvinylidene fluoride, or ceramics. The separator may be a single-layer film or a multi-layer composite film, which is not particularly limited. When the separator is a multi-layer composite film, materials of layers may be the same or different, with no particular limitation. The separator may be a single component located between the positive electrode plate and the negative electrode plate, or may be attached to the surface of the positive electrode plate and the surface of the negative electrode plate.

In some embodiments, the separator is a solid electrolyte. The solid electrolyte is disposed between the positive electrode plate and the negative electrode plate, for transmitting ions and isolating the positive and negative electrodes.

In some embodiments, the battery cell 20 further includes an electrolyte, where the electrolyte serves to conduct ions between the positive electrode plate and the negative electrode plate. The type of the electrolyte is not specifically limited in this application and may be selected according to needs. The electrolyte may be liquid, gel, or solid.

The liquid electrolyte includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro (oxalato)borate, lithium bis(oxalato) borate, lithium difluoro-bis(oxalato)phosphate, and lithium tetrafluoro(oxalato)phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methanesulfonate, and diethyl sulfone. The solvent may also be selected from ether solvents. The ether solvents may include one or more of ethylene glycol dimethyl ether, ethylene glycol diethyl ether, diethylene glycol dimethyl ether, triethylene glycol dimethyl ether, tetraethylene glycol dimethyl ether, 1,3-dioxolane, tetrahydrofuran, methyl tetrahydrofuran, diphenyl ether, and crown ether.

The gel electrolyte includes a skeleton network with a polymer as the electrolyte, together with an ionic liquid-lithium salt.

The solid electrolyte includes a polymer solid electrolyte, an inorganic solid electrolyte, and a composite solid electrolyte.

As an example, the polymer solid electrolyte may be polyether (polyethylene oxide), polysiloxane, polycarbonate, polyacrylonitrile, polyvinylidene fluoride, polymethyl methacrylate, single-ion polymer, polyionic liquid-lithium salt, cellulose, or the like.

As an example, the inorganic solid electrolyte may be one or more of an oxide solid electrolyte (crystalline perovskite, sodium superionic conductor, garnet, or amorphous LiPON film), a sulfide solid electrolyte (crystalline lithium superionic conductor (lithium germanium phosphorus sulfide, or argyrodite), or amorphous sulfide), a halide solid electrolyte, a nitride solid electrolyte, and a hydride solid electrolyte.

As an example, the composite solid electrolyte is formed by adding inorganic solid electrolyte fillers to the polymer solid electrolyte.

In some embodiments, the electrode assembly 24 may be cylindrical, flat, polygonal prismatic, or in other shapes.

In some embodiments, the electrode assembly 24 is provided with tabs, where the tabs can conduct current from the electrode assembly 24. The tabs include a positive tab and a negative tab.

The electrode terminals 23 are components electrically connected to the electrode assembly 24 to output electric energy from the battery cell 20 or input electric energy to the battery cell 20. The electrode terminals 23 may be disposed on the end cap 222, where a portion of the electrode terminals 23 extends into the internal environment of the battery cell 20 and is directly or indirectly connected to the tabs of the electrode assembly 24, and another portion of the electrode terminals 23 is exposed to the external environment of the battery cell 20 and connected to components such as a busbar or a sampling device. Optionally, the electrode terminals 23 may have a columnar structure, such as a cylindrical structure, a prismatic structure, or the like, or the electrode terminals 23 may have a plate-like structure, such as a circular plate, a square plate, or the like, or the electrode terminals 23 may have other irregular three-dimensional structures, with no specific limitation herein. The electrode terminals 23 may be made of a single metal material or multiple metal materials, where the metal materials may include, but are not limited to, copper, aluminum, nickel, zinc, iron, or the like, with no specific limitation herein.

The insulator 25 refers to a component made of an insulating material, where the insulator 25 is located between the housing 22 and the electrode terminals 23 to insulate and separate the housing 22 and the electrode terminals 23, reducing the risk of a short circuit. The insulating material may include, but is not limited to, plastic, rubber, or the like.

The following describes in detail the technical solutions provided in this application with reference to specific accompanying drawings and embodiments.

According to a first aspect, referring to FIG. 4 to FIG. 11, the battery cell 20 provided in an embodiment of this application further includes a protective member 21. The housing 22 is configured to accommodate the electrode assembly 24, where the housing 22 includes a wall portion and a fastener 223, the fastener 223 includes a connecting portion 2231 connected to the wall portion and a pressing portion 2232 connected to the connecting portion 2231, and the connecting portion 2231 and the pressing portion 2232 jointly define a cavity. The electrode terminals 23 are electrically connected to the electrode assembly 24, and at least a portion of the electrode terminals 23 is accommodated in the cavity. The insulator 25 is disposed between the fastener 223 and the electrode terminals 23, where the pressing portion 2232 presses against the electrode terminals 23 through the insulator 25 to fix the electrode terminals 23 on the wall portion. The protective member 21 includes a first protective portion 211 and a second protective portion 212 connected to each other, where the first protective portion 211 covers the connecting portion 2231, the second protective portion 212 covers the pressing portion 2232, the second protective portion 212 protrudes beyond the pressing portion 2232 along a first direction, and the first direction is a direction pointing from the pressing portion 2232 to the electrode terminals 23 and perpendicular to a thickness direction of the wall portion.

For convenience of description below, the thickness direction of the wall portion of the housing 22 is referred to as a second direction, namely the Y direction in FIG. 7 to FIG. 11.

The wall portion of the housing 22 may be any wall of the housing body 221, for example, a side wall of the housing body 221, a bottom wall of the housing body 221, or a cover plate of the end cap 222, with no specific limitation herein.

Figure 11:
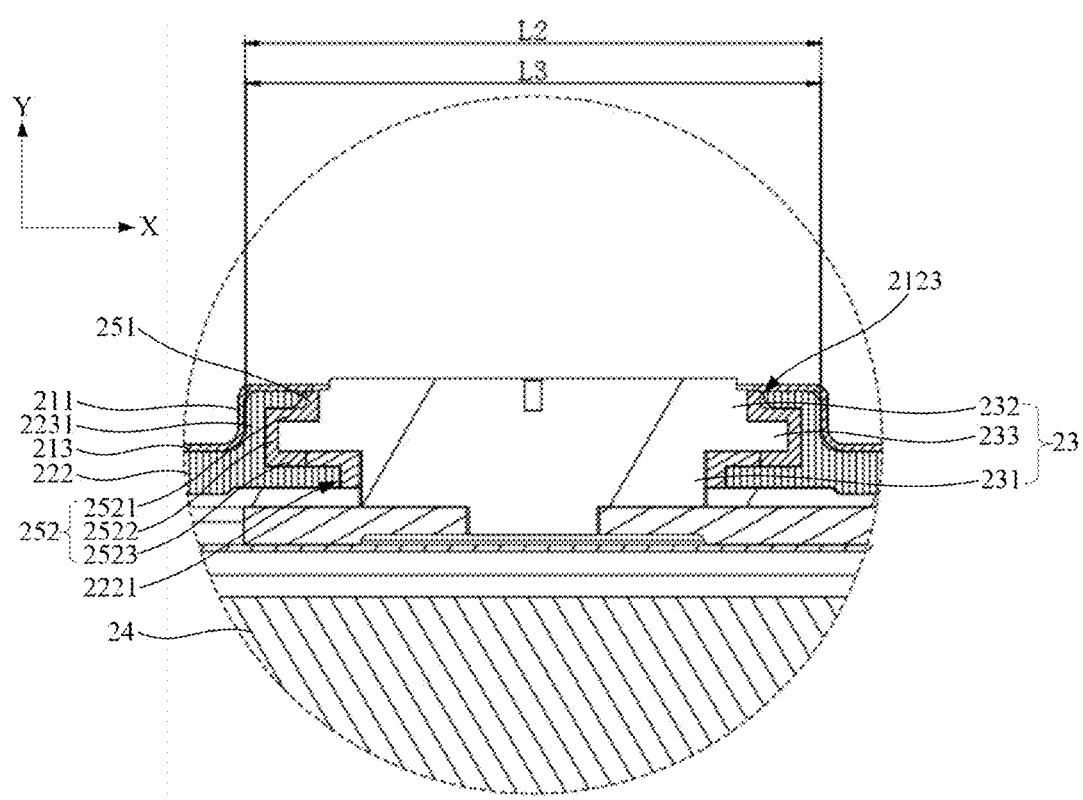
FIG. 11 is an enlarged view of position C of the battery cell shown in FIG. 6.

The fastener 223 refers to a component of the housing 22 that protrudes from the wall portion and is configured to fix the electrode terminals 23. The fastener 223 and the wall portion of the housing 22 may be an integrated structure, for example, the fastener 223 and the wall portion of the housing 22 are manufactured and formed using an integration process such as extrusion, injection molding, or die casting. The fastener 223 and the wall portion of the housing 22 may also be a separate structure, that is, the fastener 223 and the wall portion of the housing 22 are separately formed and then connected together. Referring to FIG. 11, the wall portion of the housing 22 is provided with a first through hole 2221, and the fastener 223 is annularly disposed around the first through hole 2221 and encloses a cavity for accommodating the electrode terminals 23.

Specifically, the fastener 223 includes a connecting portion 2231 and a pressing portion 2232.

The connecting portion 2231 refers to a portion of the fastener 223 located between the pressing portion 2232 and the wall portion of the housing 22, where the connecting portion 2231 serves to connect the pressing portion 2232 and the wall portion of the housing 22, and may also support the pressing portion 2232. The connecting portion 2231 is annularly disposed around the first through hole 2221, where the connecting portion 2231 may be an annular integral structure disposed around the first through hole 2221, or the connecting portion 2231 may be a segmented structure annularly arranged along a circumferential direction of the first through hole 2221.

The pressing portion 2232 refers to a portion of the fastener 223 configured to press against the insulator 25. The pressing portion 2232 may be parallel to the wall portion of the housing 22 and spaced apart from the wall portion of the housing 22, or may be inclined relative to the wall portion of the housing 22. The specific design may depend on actual structures, with no limitation herein. The pressing portion 2232 may be an annular integral structure annularly disposed outside the electrode terminals 23, or the pressing portion 2232 may be a segmented structure annularly arranged along a circumferential direction of the electrode terminals 23. Referring to FIG. 11, the pressing portion 2232 encloses a second through hole 2123, where the first through hole 2221, the cavity, and the second through hole 2123 are sequentially connected along the second direction.

The electrode terminals 23 may be partially or entirely located within the cavity enclosed by the fastener 223. The electrode terminals 23 may be electrically connected to an electrical connector through the first through hole 2221 and then electrically connected to the electrode assembly 24. The electrode terminals 23 may alternatively be exposed to an external environment of the battery cell 20 through the second through hole 2123 and then electrically connected to a busbar to achieve electric energy output and input of the battery cell 20.

In some embodiments, referring to FIG. 11, the electrode terminals 23 include a first connecting segment 231 and a second connecting segment 232, where the first connecting segment 231 and the second connecting segment 232 are distributed along the second direction and connected to each other to form a main body of the electrode terminals 23. At least a portion of the first connecting segment 231 is disposed within the first through hole 2221 and extends into the internal environment of the battery cell 20 for electrical connection with an electrical connector and then electrical connection with the electrode assembly 24. At least a portion of the second connecting segment 232 is exposed to the external environment of the battery cell 20 through the second through hole 2123, and then electrically connected to a busbar. The electrode terminals 23 may further include a flange portion 233, where the flange portion 233 is annularly disposed around the main body of the electrode terminals 23 and located within the cavity enclosed by the fastener 223, and the insulator 25 is at least partially located between the pressing portion 2232 and the flange portion 233, so that the pressing portion 2232 presses against the insulator 25, and the insulator 25 presses against the flange portion 233, thereby fixing the electrode terminals 23 on the wall portion of the housing 22.

The protective member 21 covers the fastener 223. This can insulate the fastener 223 from other components to prevent a short circuit between the housing 22 and external circuits, and protect the fastener 223 against scratches. The protective member 21 is made of an insulating material, where the insulating material may include, but is not limited to, polyimide, polyethylene, polyvinylidene fluoride, polytetrafluoroethylene, or the like, with no specific limitation herein. The protective member 21 includes a first protective portion 211 and a second protective portion 212. The first protective portion 211 covers the connecting portion 2231. Specifically, the first protective portion 211 covers a wall surface of the connecting portion 2231 facing away from the electrode terminals 23. The shape of the first protective portion 211 is adapted to the shape of the connecting portion 2231. For example, when the connecting portion 2231 has an annular structure, the first protective portion 211 also has an annular structure. The second protective portion 212 covers the pressing portion 2232. Specifically, the second protective portion 212 covers a surface of the pressing portion 2232 facing away from the electrode assembly 24. The shape of the second protective portion 212 is adapted to the shape of the pressing portion 2232. For example, when the pressing portion 2232 has an annular structure, the second protective portion 212 also has an annular structure.

One side of the second protective portion 212 along the first direction is connected to the first protective portion 211, and another side of the second protective portion 212 along the first direction protrudes beyond the pressing portion 2232. In other words, along the first direction, a distance between the second protective portion 212 and the second connecting segment 232 of the electrode terminals 23 is less than a distance between the pressing portion 2232 and the second connecting segment 232 of the electrode terminals 23. The first direction may be any direction pointing from the pressing portion 2232 to the electrode terminals 23 and perpendicular to the second direction, for example, the X direction shown in FIG. 7 to FIG. 11.

The battery cell 20 provided in the embodiments of this application effectively shields the pressing portion 2232 by means of having the second protective portion 212 protrude beyond the pressing portion 2232 along the first direction. This reduces the risk that metal burrs on the pressing portion 2232 extend outward or external metal wires have contact with the pressing portion 2232, lowering the possibility of metal burrs on the pressing portion 2232 or external metal wires bridging between the pressing portion 2232 and exposed portions of the electrode terminals 23, and thereby effectively reduces the risk of a short-circuit fault in the battery cell 20 and enhances the reliability of the battery cell 20.

Figure 7:
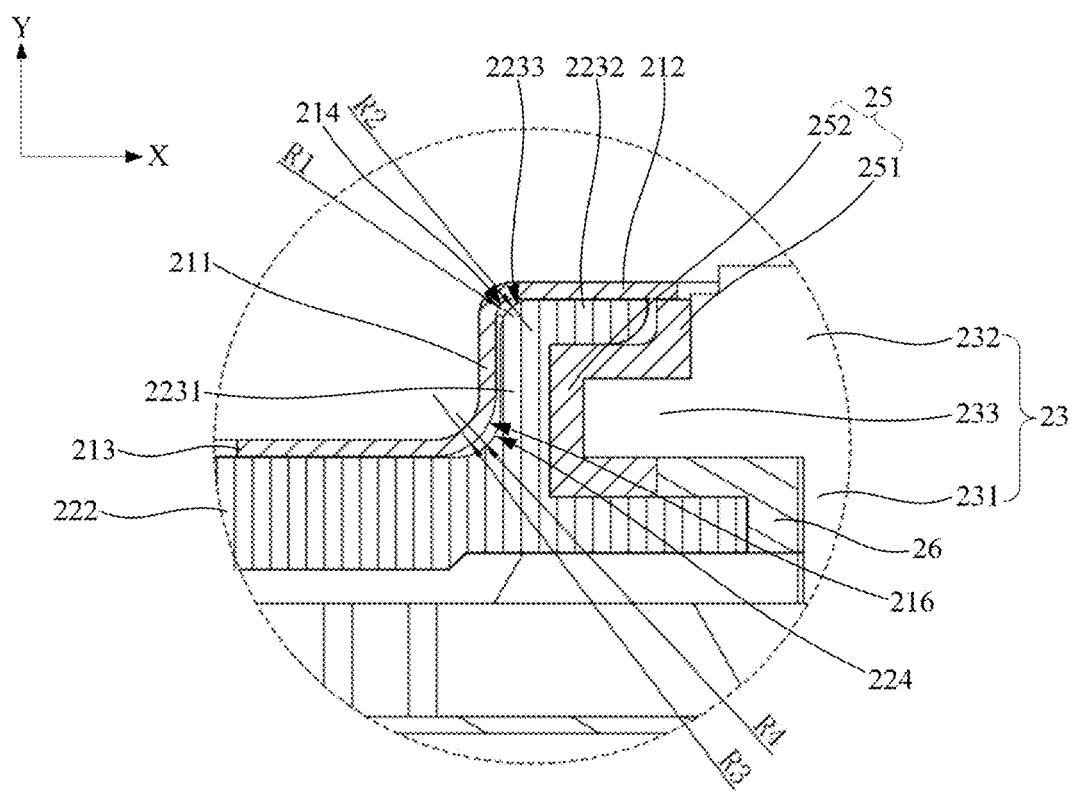
FIG. 7 is a first enlarged view of position B of the battery cell shown in FIG. 6.

In some embodiments of this application, referring to FIG. 7, the insulator 25 includes a first insulating portion 251. Along the first direction, the first insulating portion 251 is disposed between the pressing portion 2232 and the electrode terminals 23.

Along the first direction, the first insulating portion 251 is disposed between the pressing portion 2232 and the electrode terminals 23. In other words, the first insulating portion 251 is disposed between a hole wall of the second through hole 2123 and the second connecting segment 232 of the electrode terminals 23, so that along the first direction, the first insulating portion 251 separates the second connecting segment 232 and the pressing portion 2232 to achieve insulation and separation between the fastener 223 and the electrode terminals 23.

In this technical solution, the first insulating portion 251 insulates and separates the pressing portion 2232 and the electrode terminals 23 along the first direction, further reducing the risk that metal burrs on the pressing portion 2232 or external metal wires bridge between the pressing portion 2232 and exposed portions of the electrode terminals 23. This further reduces the risk of a short-circuit fault in the battery cell 20 and enhances the reliability of the battery cell 20.

In some embodiments of this application, referring to FIG. 7, at least a portion of a projection of the second protective portion 212 in the second direction overlaps with a projection of the first insulating portion 251 in the second direction.

A plane perpendicular to the Y direction shown in FIG. 7 is defined as a first projection plane, and the projection of the second protective portion 212 on the first projection plane at least partially overlaps with the projection of the first insulating portion 251 on the first projection plane. In other words, in the second direction, at least a portion of the second protective portion 212 protruding beyond the pressing portion 2232 is located above the first insulating portion 251. The portion of the second protective portion 212 protruding beyond the pressing portion 2232 may be fixedly connected to the first insulating portion 251, may abut against the first insulating portion 251, or may be spaced apart from the first insulating portion 251 along the second direction.

In this technical solution, at least a portion of the second protective portion 212 covers the first insulating portion 251. In this way, the pressing portion 2232 and the electrode terminals 23 are insulated and separated more reliably, further reducing the risk that metal burrs on the pressing portion 2232 or external metal wires bridge between the pressing portion 2232 and exposed portions of the electrode terminals 23. This further reduces the risk of a short-circuit fault in the battery cell 20 and enhances the reliability of the battery cell 20.

In some embodiments of this application, the second protective portion 212 is fixedly connected to the first insulating portion 251.

It can be understood that at least a portion of the second protective portion 212 protruding beyond the pressing portion 2232 is fixedly connected to an end surface of the first insulating portion 251 facing away from the electrode assembly 24. The manner in which the second protective portion 212 is fixedly connected to the first insulating portion 251 may include, but is not limited to, adhesion, welding, or the like, with no specific limitation herein.

With the second protective portion 212 fixedly connected to the first insulating portion 251, under the cooperative action of the second protective portion 212 and the first insulating portion 251, the pressing portion 2232 and the electrode terminals 23 are fully separated, further reducing the risk that metal burrs on the pressing portion 2232 or external metal wires bridge between the pressing portion 2232 and exposed portions of the electrode terminals 23. This further reduces the risk of a short-circuit fault in the battery cell 20 and enhances the reliability of the battery cell 20.

In some embodiments of this application, referring to FIG. 7, in the second direction, an end surface of the first insulating portion 251 facing away from the electrode assembly 24 is flush with a surface of the pressing portion 2232 facing away from the electrode assembly 24, and the second protective portion 212 is fixedly connected to the end surface of the first insulating portion 251.

In other words, in the second direction, the height position of the end surface of the first insulating portion 251 facing away from the electrode assembly 24 is the same as the height position of the surface of the pressing portion 2232 facing away from the electrode assembly 24. With the second protective portion 212 fixedly connected to the end surface of the first insulating portion 251, the second protective portion 212 and the first insulating portion 251 can be easily connected, while the second protective portion 212 is hardly bent, reducing the connection stress between the second protective portion 212 and the first insulating portion 251. This reduces the risk of the second protective portion 212 detaching from the first insulating portion 251.

In some other embodiments of this application, in the second direction, at least a portion of the first insulating portion 251 protrudes beyond the surface of the pressing portion 2232 facing away from the electrode assembly 24.

In other words, in the second direction, the height of the end surface of the first insulating portion 251 facing away from the electrode assembly 24 is greater than the height of the surface of the pressing portion 2232 facing away from the electrode assembly 24. As such, in the first direction, the first insulating portion 251 can better insulate and separate the pressing portion 2232 and the electrode terminals 23, further reducing the risk that metal burrs on the pressing portion 2232 or external metal wires bridge between the pressing portion 2232 and exposed portions of the electrode terminals 23. This further reduces the risk of a short-circuit fault in the battery cell 20 and enhances the reliability of the battery cell 20.

In some embodiments of this application, referring to FIG. 7, the insulator 25 further includes a second insulating portion 252 connected to an end of the first insulating portion 251 facing the electrode assembly 24, where along the first direction, the second insulating portion 252 is disposed between the connecting portion 2231 and the electrode terminals 23.

Specifically, the second insulating portion 252 covers at least a portion of the foregoing flange portion 233. For example, the second insulating portion 252 covers a surface of the flange portion 233 facing away from the electrode assembly 24, the second insulating portion 252 covers a surface of the flange portion 233 facing away from the main body of the electrode terminals 23, the second insulating portion 252 covers a surface of the flange portion 233 facing away from the pressing portion 2232, or the second insulating portion 252 covers the surface of the flange portion 233 facing away from the electrode assembly 24, the surface of the flange portion 233 facing away from the main body of the electrode terminals 23, and the surface of the flange portion 233 facing away from the pressing portion 2232. The pressing portion 2232 presses against the surface of the second insulating portion 252 facing away from the electrode assembly 24. It can be understood that the pressing portion 2232 presses the second insulating portion 252 toward the electrode assembly 24, and the second insulating portion 252 pushes against the flange portion 233, thereby fixing the electrode terminals 23 on the wall portion of the housing 22.

In this technical solution, the second insulating portion 252 insulates and separates the connecting portion 2231 and the electrode terminals 23, thereby further reducing the risk of a short-circuit fault in the battery cell 20 and enhancing the reliability of the battery cell 20.

In some embodiments of this application, referring to FIG. 11, the second insulating portion 252 includes a first insulating segment 2521, a second insulating segment 2522, and a third insulating segment 2523, where the first insulating segment 2521 is connected to the first insulating portion 251, the first insulating segment 2521, the second insulating segment 2522, and the third insulating segment 2523 enclose a cladding cavity, and at least a portion of the electrode terminals 23 is disposed within the cladding cavity. For example, the forgoing flange portion 233 is disposed within the cladding cavity, so that the second insulating portion 252 covers the surface of the flange portion 233 facing away from the electrode assembly 24, the surface of the flange portion 233 facing away from the main body of the electrode terminals 23, and the surface of the flange portion 233 facing away from the pressing portion 2232.

In this technical solution, the connecting portion 2231 and the electrode terminals 23 are effectively insulated and separated, thereby further reducing the risk of a short-circuit fault in the battery cell 20 and enhancing the reliability of the battery cell 20.

Figure 8:
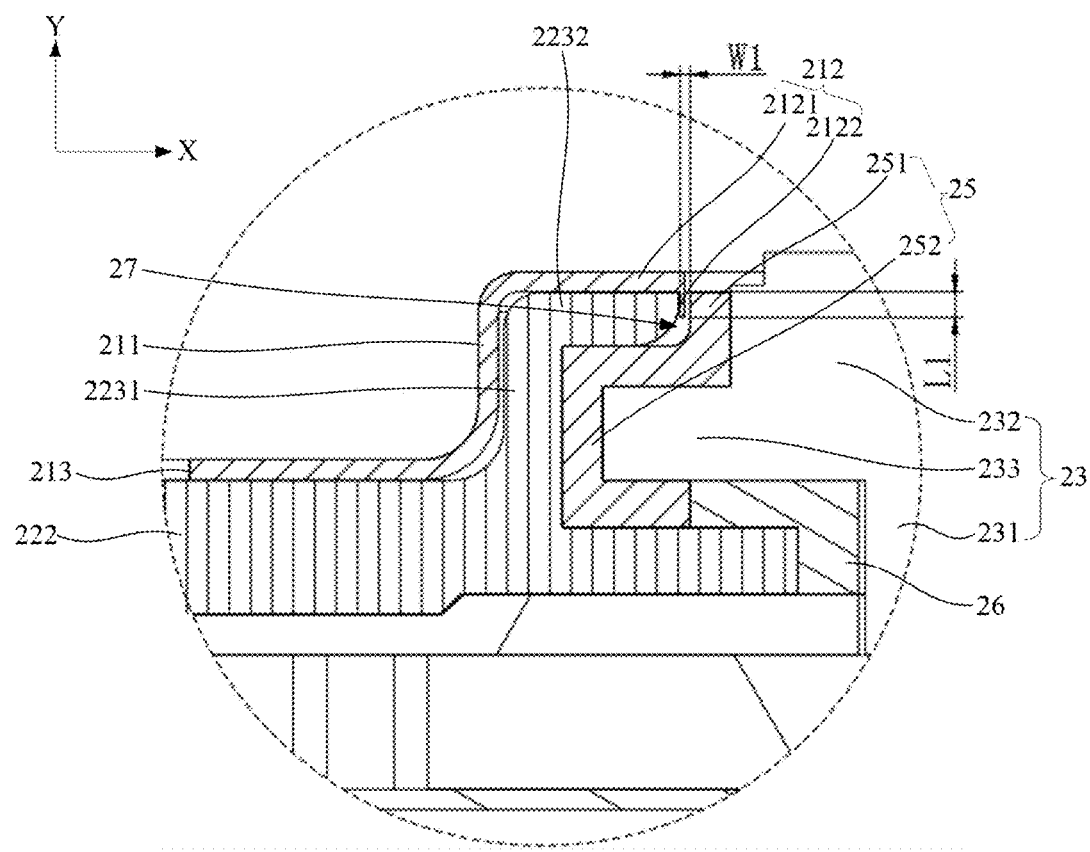
FIG. 8 is a second enlarged view of position B of the battery cell shown in FIG. 6.

In some other embodiments of this application, referring to FIG. 8, the second protective portion 212 includes a cover body 2121 and a flange 2122, where one side of the cover body 2121 along the first direction is connected to the first protective portion 211, the other side of the cover body 2121 along the first direction is connected to the flange 2122, and in the second direction, the cover body 2121 covers the surface of the pressing portion 2232 facing away from the electrode assembly 24 and the flange 2122 covers a side of the pressing portion 2232 facing the electrode terminals 23 along the first direction.

The cover body 2121 is a portion of the second protective portion 212 used to cover the surface of the pressing portion 2232 facing away from the electrode assembly 24. The cover body 2121 may be fixedly connected to the surface of the pressing portion 2232 facing away from the electrode assembly 24. For example, the cover body 2121 is adhered to the surface of the pressing portion 2232 facing away from the electrode assembly 24. Alternatively, the cover body 2121 may simply abut against the surface of the pressing portion 2232 facing away from the electrode assembly 24.

The flange 2122 is a portion of the second protective portion 212 used to cover the side of the pressing portion 2232 facing the electrode terminals 23 along the first direction. One side of the cover body 2121 along the first direction is connected to the first protective portion 211, and the other side of the cover body 2121 along the first direction is connected to the flange 2122. In other words, in the first direction, the flange 2122 is located on the side of the cover body 2121 facing away from the first protective portion 211. The flange 2122 may be inclined relative to the cover body 2121, or the flange 2122 may be perpendicular to the cover body 2121. The flange 2122 may be fixedly connected to the side of the pressing portion 2232 facing the electrode terminals 23 along the first direction. For example, the cover body 2121 is adhered to the side of the pressing portion 2232 facing the electrode terminals 23 along the first direction. Alternatively, the flange 2122 may abut against the side of the pressing portion 2232 facing the electrode terminals 23 along the first direction, or the flange 2122 may be spaced apart from the side of the pressing portion 2232 facing the electrode terminals 23 along the first direction.

It can be understood that the pressing portion 2232 and the second connecting segment 232 of the electrode terminals 23 are spaced apart along the first direction, and at least a portion of the flange 2122 is disposed in the space between the pressing portion 2232 and the electrode terminals 23 along the first direction, thereby insulating and separating the pressing portion 2232 and the electrode terminals 23.

In this technical solution, the flange 2122 separates the pressing portion 2232 and the electrode terminals 23 along the first direction, further reducing the risk that metal burrs on the pressing portion 2232 or external metal wires bridge between the pressing portion 2232 and exposed portions of the electrode terminals 23. This further reduces the risk of a short-circuit fault in the battery cell 20 and enhances the reliability of the battery cell 20.

In some embodiments of this application, referring to FIG. 8, when the insulator 25 includes the first insulating portion 251 and the first insulating portion 251 is disposed between the pressing portion 2232 and the electrode terminals 23 along the first direction, a gap 27 is formed between the first insulating portion 251 and the pressing portion 2232 along the first direction, and at least a portion of the flange 2122 is accommodated in the gap 27.

In other words, the pressing portion 2232, the flange 2122, the first insulating portion 251, and the second connecting segment 232 of the electrode terminals 23 are sequentially arranged along the first direction, where the first insulating portion 251 is spaced apart from the pressing portion 2232 along the first direction. It can be understood that the first insulating portion 251 may be spaced apart from the second connecting segment 232 along the first direction, or the first insulating portion 251 may abut against the second connecting segment 232 along the first direction.

In this technical solution, the flange 2122 and the first insulating portion 251 jointly insulate and separate the pressing portion 2232 and the electrode terminals 23 along the first direction, further reducing the risk that metal burrs on the pressing portion 2232 or external metal wires bridge between the pressing portion 2232 and exposed portions of the electrode terminals 23. In addition, the flange 2122 is restricted within the gap 27 to reduce the risk of the flange 2122 detaching from the position between the pressing portion 2232 and the electrode terminals 23, thereby further reducing the risk of a short-circuit fault in the battery cell 20 and enhancing the reliability of the battery cell 20.

In some embodiments of this application, referring to FIG. 8, a length L1 of the portion of the flange 2122 accommodated in the gap 27 is greater than a minimum width of the gap 27.

The length L1 of the portion of the flange 2122 accommodated in the gap 27 refers to the dimension of the portion of the flange 2122 accommodated in the gap 27 along the second direction. The minimum width of the gap 27 refers to the smallest dimension of the gap 27 along the first direction.

When the portion of the flange 2122 accommodated in the gap 27 abuts against the side of the pressing portion 2232 facing the electrode terminals 23 along the first direction, the length L1 of the portion of the flange 2122 accommodated in the gap 27 is greater than the minimum width of the gap 27. Therefore, after the flange 2122 flips toward the first insulating portion 251 to a certain extent, the first insulating portion 251 hinders further flipping of the flange 2122, thereby restricting the flipping range of the flange 2122 within the gap 27 to a certain extent. This reduces the risk of the flange 2122 flipping out of the gap 27.

It can be understood that, since the first insulating portion 251 hinders the flipping of the flange 2122 when the portion of the flange 2122 accommodated in the gap 27 abuts against the side of the pressing portion 2232 facing the electrode terminals 23 along the first direction. Similarly, when the portion of the flange 2122 accommodated in the gap 27 is spaced apart from the side of the pressing portion 2232 facing the electrode terminals 23 along the first direction, the first insulating portion 251 also hinders the flipping of the flange 2122 toward the first insulating portion 251.

In some embodiments of this application, referring to FIG. 8, a thickness of the flange 2122 is less than a width W1 of the gap 27.

The thickness of the flange 2122 refers to the dimension of the flange 2122 along the first direction when the flange 2122 is parallel to the second direction.

In this technical solution, the flange 2122 can be easily inserted into the gap 27.

In some embodiments of this application, the flange 2122 is fixedly connected to the side of the pressing portion 2232 facing the electrode terminals 23 along the first direction.

The manner in which the flange 2122 is fixedly connected to the side of the pressing portion 2232 facing the electrode terminals 23 along the first direction may include, but is not limited to, adhesion, welding, or the like, with no specific limitation herein.

In this technical solution, the relative positions of the flange 2122 and the pressing portion 2232 are kept unchanged, so that the flange 2122 separates the pressing portion 2232 and the electrode terminals 23 along the first direction, further reducing the risk that metal burrs on the pressing portion 2232 or external metal wires bridge between the pressing portion 2232 and exposed portions of the electrode terminals 23. This further reduces the risk of a short-circuit fault in the battery cell 20 and enhances the reliability of the battery cell 20.

In some embodiments of this application, referring to FIG. 8, a cross-section of the side of the pressing portion 2232 facing the electrode terminals 23 along the first direction is an arcuate structure in the second direction.

In other words, in the second direction, the surface of the side of the pressing portion 2232 facing the electrode terminals 23 along the first direction is an arcuate surface. Compared to a flat surface of the side of the pressing portion 2232 facing the electrode terminals 23 along the first direction, an arcuate surface effectively increases the area of connection between the flange 2122 and the pressing portion 2232. This enhances the connection strength between the flange 2122 and the pressing portion 2232 and controls the lifting of the flange 2122, thereby maintaining the relative positions of the flange 2122 and the pressing portion 2232 more effectively.

In some embodiments of this application, referring to FIG. 7, a side of a joint between the first protective portion 211 and the second protective portion 212 facing the fastener 223 has a first fillet structure 214.

The first fillet structure 214 refers to that the surface of the connection between the first protective portion 211 and the second protective portion 212 facing the fastener 223 is an arcuate surface, where the arcuate surface is recessed in a direction away from the fastener 223. A radius R1 of the first fillet structure 214 may be determined based on actual application needs. In some embodiments, the radius R1 of the first fillet structure 214 may include, but is not limited to, 0.4 mm, 0.5 mm, 0.6 mm, 0.7 mm, 0.8 mm, 0.9 mm, 1 mm, 1.1 mm, 1.2 mm, or 1.3 mm, with no specific limitation herein.

In this technical solution, the connection stress between the first protective portion 211 and the second protective portion 212 is effectively reduced, so that the second protective portion 212 is less likely to detach from the pressing portion 2232 due to lifting, thereby further reducing the risk of a short-circuit fault in the battery cell 20 and enhancing the reliability of the battery cell 20.

In some embodiments of this application, referring to FIG. 7, a side of a joint between the connecting portion 2231 and the pressing portion 2232 facing the first fillet structure 214 has a second fillet structure 2233.

The second fillet structure 2233 refers to that the surface of the connection between the connecting portion 2231 and the pressing portion 2232 facing the first fillet structure 214 is an arcuate surface, where the arcuate surface protrudes toward the protective member 21. A radius R2 of the second fillet structure 2233 may be determined based on actual application needs. In some embodiments, the radius R2 of the second fillet structure 2233 may include, but is not limited to, 0.4 mm, 0.5 mm, 0.6 mm, 0.7 mm, 0.8 mm, 0.9 mm, 1 mm, 1.1 mm, 1.2 mm, or 1.3 mm, with no specific limitation herein.

In this technical solution, the connection stress between the connecting portion 2231 and the pressing portion 2232 is effectively reduced to control the risk of fracture of the connecting portion 2231 and the pressing portion 2232, further enhancing the reliability of the battery cell 20.

In some embodiments of this application, the radius R1 of the first fillet structure 214 is less than or equal to the radius R2 of the second fillet structure 2233.

In this technical solution, the joint between the first protective portion 211 and the second protective portion 212 less interferes with the joint between the connecting portion 2231 and the pressing portion 2232, so that the second protective portion 212 is less likely to detach from the pressing portion 2232 due to lifting. This further reduces the risk of a short-circuit fault in the battery cell 20 and enhances the reliability of the battery cell 20.

Figure 9:
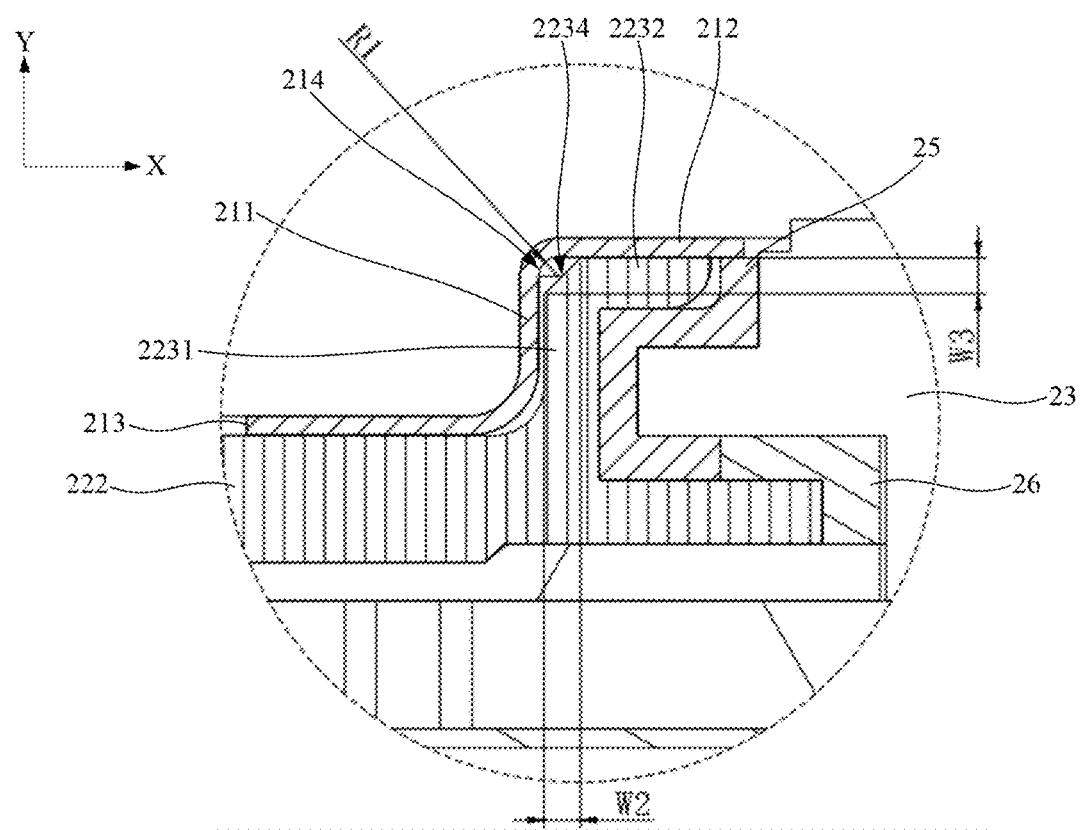
FIG. 9 is a third enlarged view of position B of the battery cell shown in FIG. 6.

In some other embodiments of this application, referring to FIG. 9, a side of a joint between the connecting portion 2231 and the pressing portion 2232 facing the first fillet structure 214 has a first chamfered structure 2234.

The first chamfered structure 2234 refers to that the surface of the connection between the connecting portion 2231 and the pressing portion 2232 facing the first fillet structure 214 is an inclined surface, where the first chamfered structure 2234 is inclined relative to the first direction. The angle of inclination of the first chamfered structure 2234 relative to the first direction may include, but is not limited to, 30°, 45°, 60°, or the like, with no specific limitation herein. As shown in FIG. 9, the first chamfered structure 2234 extends obliquely upward from the surface of the connecting portion 2231 facing away from the electrode terminals 23 to the surface of the pressing portion 2232 facing away from the electrode assembly 24. During the process of bending the fastener 223 using a tool to form the pressing portion 2232, the tool is provided with an inclined surface adapted to the first chamfered structure 2234, and the fastener 223 is pressed by this inclined surface to form the first chamfered structure 2234. When the inclined surface presses the fastener 223, the inclined surface on the fastener 223 applies a force toward the fastener 223 in a direction perpendicular to the first chamfered structure 2234. The component of this force along the X direction facilitates the bending process of the fastener 223, and the tool is easy to control due to the counterforce, so that the fastener 223 can be bent conveniently.

In this technical solution, the fastener 223 can be easily bent. After the first chamfered structure 2234 is formed, a portion of the material of the pressing portion 2232 displaces toward the electrode terminals 23, effectively increasing the downward pressure exerted by the pressing portion 2232 on the insulator 25. In this way, the electrode terminals 23 can be fixed more firmly on the wall portion of the housing 22.

In some embodiments of this application, referring to FIG. 9, a projection of the first chamfered structure 2234 in the second direction has a first width W2, and a projection of the first chamfered structure 2234 in the first direction has a second width W3; where the radius R1 of the first fillet structure 214 is less than or equal to the first width W2, and the radius R1 of the first fillet structure 214 is less than or equal to the second width W3.

A plane perpendicular to the Y direction shown in FIG. 9 is defined as a first projection plane, and the projection of the first chamfered structure 2234 on the first projection plane has a first width W2. The size of the first width W2 of the projection of the first chamfered structure 2234 on the first projection plane may be determined based on actual application needs. In some embodiments, the first width W2 may include, but is not limited to, 0.4 mm, 0.5 mm, 0.6 mm, 0.7 mm, 0.8 mm, 0.9 mm, 1 mm, 1.1 mm, 1.2 mm, or 1.3 mm, with no specific limitation herein. It should be noted that the radius R1 of the first fillet structure 214 is less than or equal to the first width W2.

A plane perpendicular to the X direction shown in FIG. 9 is defined as a second projection plane, and the projection of the first chamfered structure 2234 on the second projection plane has a second width W3. The size of the second width W3 of the projection of the first chamfered structure 2234 on the second projection plane may be determined based on actual application needs. In some embodiments, the second width W3 may include, but is not limited to, 0.4 mm, 0.5 mm, 0.6 mm, 0.7 mm, 0.8 mm, 0.9 mm, 1 mm, 1.1 mm, 1.2 mm, or 1.3 mm, with no specific limitation herein. It should be noted that the radius R1 of the first fillet structure 214 is less than or equal to the second width W3.

In this technical solution, the joint between the first protective portion 211 and the second protective portion 212 less interferes with the joint between the connecting portion 2231 and the pressing portion 2232, so that the second protective portion 212 is less likely to detach from the pressing portion 2232 due to lifting, thereby further reducing the risk of a short-circuit fault in the battery cell 20 and enhancing the reliability of the battery cell 20.

Figure 10:
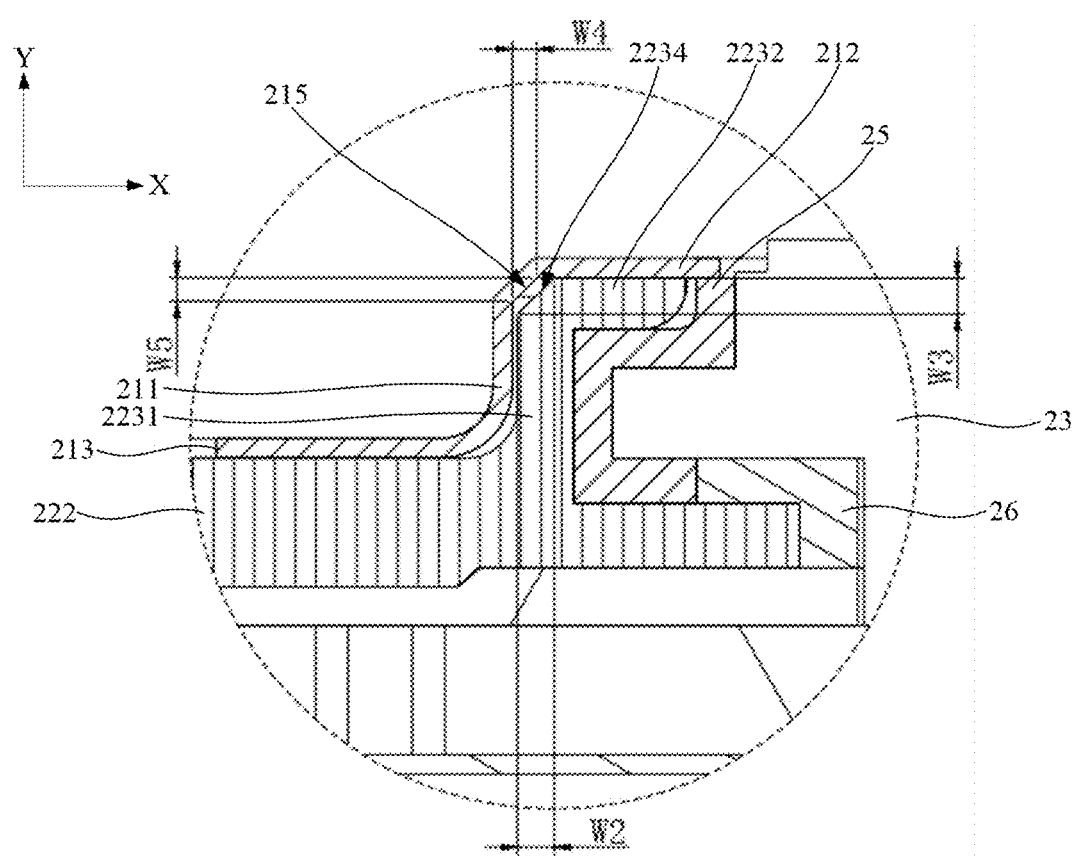
FIG. 10 is a fourth enlarged view of position B of the battery cell shown in FIG. 6.

In some other embodiments of this application, referring to FIG. 10, a side of the joint between the connecting portion 2231 and the pressing portion 2232 facing the protective member 21 has a first chamfered structure 2234, a side of the joint between the first protective portion 211 and the second protective portion 212 facing the first chamfered structure 2234 has a second chamfered structure 215; the projection of the first chamfered structure 2234 in the second direction has a first width W2, the projection of the first chamfered structure 2234 in the first direction has a second width W3; a projection of the second chamfered structure 215 in the second direction has a third width W4, a projection of the second chamfered structure 215 in the first direction has a fourth width W5; the third width W4 is less than or equal to the first width W2, and the fourth width W5 is less than or equal to the second width W3.

The second chamfered structure 215 refers to the surface of the connection between the first protective portion 211 and the second protective portion 212 facing the first chamfered structure 2234 being an inclined surface, where the second chamfered structure 215 is inclined relative to the first direction. The angle of inclination of the second chamfered structure 215 relative to the first direction may include, but is not limited to, 30°, 45°, 60°, or the like, with no specific limitation herein. For example, as shown in FIG. 10, the second chamfered structure 215 extends obliquely upward from the surface of the first protective portion 211 facing the fastener 223 to the surface of the second protective portion 212 facing the fastener 223.

A plane perpendicular to the Y direction shown in FIG. 10 is defined as a first projection plane, the projection of the first chamfered structure 2234 on the first projection plane has a first width W2, and the projection of the second chamfered structure 215 on the first projection plane has a third width W4. The size of the first width W2 of the projection of the first chamfered structure 2234 on the first projection plane may be determined based on actual application needs. In some embodiments, the first width W2 may include, but is not limited to, 0.4 mm, 0.5 mm, 0.6 mm, 0.7 mm, 0.8 mm, 0.9 mm, 1 mm, 1.1 mm, 1.2 mm, or 1.3 mm, with no specific limitation herein. Similarly, the size of the third width W4 of the projection of the second chamfered structure 215 on the first projection plane may be determined based on actual application needs. In some embodiments, the third width W4 may include, but is not limited to, 0.4 mm, 0.5 mm, 0.6 mm, 0.7 mm, 0.8 mm, 0.9 mm, 1 mm, 1.1 mm, 1.2 mm, or 1.3 mm, with no specific limitation herein. It should be noted that the third width W4 is less than or equal to the first width W2.

A plane perpendicular to the X direction shown in FIG. 10 is defined as a second projection plane, the projection of the first chamfered structure 2234 on the second projection plane has a second width W3, and the projection of the second chamfered structure 215 on the second projection plane has a fourth width W5. The size of the second width W3 of the projection of the first chamfered structure 2234 on the second projection plane may be determined based on actual application needs. In some embodiments, the second width W3 may include, but is not limited to, 0.4 mm, 0.5 mm, 0.6 mm, 0.7 mm, 0.8 mm, 0.9 mm, 1 mm, 1.1 mm, 1.2 mm, or 1.3 mm, with no specific limitation herein. Similarly, the size of the fourth width W5 of the projection of the second chamfered structure 215 on the second projection plane may be determined based on actual application needs. In some embodiments, the fourth width W5 may include, but is not limited to, 0.4 mm, 0.5 mm, 0.6 mm, 0.7 mm, 0.8 mm, 0.9 mm, 1 mm, 1.1 mm, 1.2 mm, or 1.3 mm, with no specific limitation herein. It should be noted that the fourth width W5 is less than or equal to the second width W3.

In this technical solution, the joint between the first protective portion 211 and the second protective portion 212 less interferes with the joint between the connecting portion 2231 and the pressing portion 2232, reducing the risk of the second protective portion 212 detaching from the pressing portion 2232 due to lifting. This further reduces the risk of a short-circuit fault in the battery cell 20 and enhances the reliability of the battery cell 20.

In some embodiments of this application, referring to FIG. 11, the first protective portion 211 and the connecting portion 2231 each have an annular structure, the connecting portion 2231 is annularly disposed around the first through hole 2221, the first protective portion 211 is annularly disposed around the connecting portion 2231, and an inner diameter L2 of the first protective portion 211 is greater than or equal to an outer diameter L3 of the connecting portion 2231.

The size of the inner diameter L2 of the first protective portion 211 may be determined based on actual application needs. In some embodiments, the inner diameter L2 of the first protective portion 211 may include, but is not limited to, 10 mm, 15 mm, 20 mm, 25 mm, or 30 mm, with no specific limitation herein. Similarly, the size of the outer diameter L3 of the connecting portion 2231 may be determined based on actual application needs. In some embodiments, the outer diameter L3 of the connecting portion 2231 may include, but is not limited to, 10 mm, 15 mm, 20 mm, 25 mm, or 30 mm, with no specific limitation herein. It should be noted that the inner diameter L2 of the first protective portion 211 is greater than or equal to the outer diameter L3 of the connecting portion 2231.

In this technical solution, interference between the first protective portion 211 and the connecting portion 2231 is reduced, lowering the possibility of the second protective portion 212 being lifted due to lifting of the first protective portion 211. This effectively reduces the risk of the second protective portion 212 detaching from the pressing portion 2232, thereby further reducing the risk of a short-circuit fault in the battery cell 20 and further enhancing the reliability of the battery cell 20.

In some embodiments of this application, referring to FIG. 7, the protective member 21 further includes a third protective portion 213 covering the wall portion of the housing 22, the third protective portion 213 is connected to the first protective portion 211, and a side of a joint between the third protective portion 213 and the first protective portion 211 facing the fastener 223 has a third fillet structure 216.

The third fillet structure 216 refers to that the surface of the connection between the third protective portion 213 and the first protective portion 211 facing the fastener 223 is an arcuate surface, where the arcuate surface protrudes toward the fastener 223. The radius R3 of the third fillet structure 216 may be determined based on actual application needs. In some embodiments, the radius R3 of the third fillet structure 216 may include, but is not limited to, 0.4 mm, 0.5 mm, 0.6 mm, 0.7 mm, 0.8 mm, 0.9 mm, 1 mm, 1.1 mm, 1.2 mm, or 1.3 mm, with no specific limitation herein.

In this technical solution, the connection stress between the third protective portion 213 and the first protective portion 211 is effectively reduced, lowering the possibility of the second protective portion 212 being lifted due to lifting of the first protective portion 211. This effectively reduces the risk of the second protective portion 212 detaching from the pressing portion 2232, thereby further reducing the risk of a short-circuit fault in the battery cell 20 and enhancing the reliability of the battery cell 20.

In some embodiments of this application, referring to FIG. 7, a side of a joint between the connecting portion 2231 and the wall portion of the housing 22 facing the third fillet structure 216 has a fourth fillet structure 224.

The fourth fillet structure 224 refers to that the surface of the connection between the connecting portion 2231 and the wall portion of the housing 22 facing the third fillet structure 216 is an arcuate surface, where the arcuate surface is recessed in a direction away from the protective member 21. The radius R4 of the fourth fillet structure 224 may be determined based on actual application needs. In some embodiments, the radius R4 of the fourth fillet structure 224 may include, but is not limited to, 0.4 mm, 0.5 mm, 0.6 mm, 0.7 mm, 0.8 mm, 0.9 mm, 1 mm, 1.1 mm, 1.2 mm, or 1.3 mm, with no specific limitation herein.

In this technical solution, the connection stress between the connecting portion 2231 and the wall portion is effectively reduced to control the risk of fracture of the connecting portion 2231 and the wall portion, further enhancing the reliability of the battery cell 20.

In some embodiments of this application, the radius R3 of the third fillet structure 216 is greater than or equal to the radius R4 of the fourth fillet structure 224.

In this technical solution, the joint between the first protective portion 211 and the third protective portion 213 less interferes with the joint between the connecting portion 2231 and the wall portion, lowering the possibility of the second protective portion 212 being lifted due to lifting of the first protective portion 211. This effectively reduces the risk of the second protective portion 212 detaching from the pressing portion 2232, thereby further reducing the risk of a short-circuit fault in the battery cell 20 and enhancing the reliability of the battery cell 20.

In some embodiments of this application, the first protective portion 211, the second protective portion 212, and the third protective portion 213 are integrally formed. For example, the first protective portion 211, the second protective portion 212, and the third protective portion 213 are integrally formed through an injection molding process.

In this technical solution, the manufacturing process of the protective member 21 is effectively simplified, thereby improving the manufacturing efficiency of the protective member 21 and reducing the manufacturing costs of the protective member 21.

In some embodiments of this application, the pressing portion 2232 has an annular structure and is annularly disposed around the electrode terminals 23.

The pressing portion 2232 extends along the circumferential direction of the electrode terminals 23 and forms an annular structure. It can be understood that the pressing portion 2232 is annular, and the pressing portion 2232 may be circular, elliptical, polygonal, or in other shapes, with no specific limitation herein.

In this technical solution, the pressing portion 2232 is less likely to flip outward, so that the electrode terminals 23 can be fixed more firmly on the wall portion of the housing 22.

In some embodiments of this application, referring to FIG. 7, the battery cell 20 further includes a sealing member 26, where at least a portion of the sealing member 26 is located between the wall portion and the electrode terminals 23.

The sealing member 26 is used to seal a gap between the wall portion of the housing 22 and the electrode terminals 23. The sealing member 26 may be entirely clamped between the electrode terminals 23 and the wall portion of the housing 22, or a portion of the sealing member 26 may be clamped between the electrode terminals 23 and the wall portion of the housing 22 while another portion is clamped between the electrode terminals 23 and the connecting portion 2231. Optionally, the sealing member 26 may include, but is not limited to, a sealing ring, a sealing gasket, or the like, with no specific limitation herein.

Specifically, when the insulator 25 includes the second insulating portion 252 and the electrode terminals 23 include the flange portion 233, the second insulating portion 252 covers the flange portion 233, the pressing portion 2232 presses against the second insulating portion 252, and the pressing portion 2232 applies a pressure to the second insulating portion 252. This pressure is transmitted through the second insulating portion 252 to the flange portion 233 of the electrode terminals 23, and the electrode terminals 23 press the sealing member 26 toward the wall portion of the housing 22, so that the sealing member 26 is clamped between the electrode terminals 23 and the wall portion of the housing 22. The sealing member 26 compresses and deforms under pressure, sealing the gap between the wall portion of the housing 22 and the electrode terminals 23.

In this technical solution, the sealing member 26 seals the gap between the wall portion and the electrode terminals 23, reducing the risk of electrolyte leakage from between the electrode terminals 23 and the body within the housing 22. This helps enhance the reliability of the battery cell 20.

In some embodiments of this application, referring to FIG. 4, the housing 22 includes a housing body 221 and an end cap 222, one end of the housing body 221 has an opening, the end cap 222 covers the opening, the housing body 221 includes a side wall and a bottom wall, the side wall is annularly disposed outside the electrode assembly 24, the bottom wall is disposed opposite the opening, and the wall portion is the end cap 222, the bottom wall, or the side wall.

The side wall of the housing body 221 encloses the internal environment of the housing 22, both ends of the side wall have openings, the bottom wall of the housing body 221 covers one opening of the side wall, and the end cap 222 covers the other opening of the side wall. The electrode terminals 23 may be disposed on the end cap 222, the side wall of the housing body 221, or the bottom wall of the housing body 221, depending on actual needs.

According to a second aspect, an embodiment of this application further provides a battery 100, including the foregoing battery cell 20.

A beneficial effect of the battery 100 provided in the embodiment of this application is that: with the foregoing battery cell 20, the battery 100 provided in the embodiment of this application has higher reliability.

According to a third aspect, an embodiment of this application further provides an electric apparatus, including the foregoing battery 100.

A beneficial effect of the electric apparatus provided in the embodiment of this application is that: with the foregoing battery 100 adopted, the electric apparatus provided in the embodiment of this application has higher reliability.

The foregoing descriptions are merely preferable embodiments of this application, but are not intended to limit this application. Any modification, equivalent replacement, or improvement made without departing from the spirit and principle of this application shall fall within the protection scope of this application.

What is claimed is:

1. A battery cell, wherein the battery cell comprises:
an electrode assembly;
a housing configured to accommodate the electrode assembly, wherein the housing comprises a wall portion and a fastener, the fastener and the wall portion are an integrated structure, the fastener comprises a connecting portion and a pressing portion, the connecting portion is connected to the wall portion and protrudes from the wall portion in a thickness direction of the wall portion away from the electrode assembly, the pressing portion is connected to the connecting portion and is bent relative to the connecting portion, the connecting portion and the pressing portion jointly defining a cavity;
electrode terminals electrically connected to the electrode assembly, wherein at least a portion of the electrode terminals is accommodated in the cavity;
an insulator disposed between the fastener and the electrode terminals, wherein the insulator is at least partially located between the pressing portion and the electrode terminal in the thickness direction of the wall portion, the pressing portion presses against the electrode terminals through the insulator to fix the electrode terminals on the wall portion; and
a protective member comprising a first protective portion and a second protective portion connected to each other, wherein the first protective portion covers a wall surface of the connecting portion facing away from the electrode terminals, the second protective portion covers a surface of the pressing portion facing away from the electrode assembly, the second protective portion protrudes beyond the pressing portion along a first direction, and the first direction is a direction pointing from the pressing portion to the electrode terminals and perpendicular to the thickness direction of the wall portion.

2. The battery cell according to claim 1, wherein the insulator comprises a first insulating portion, wherein along the first direction, the first insulating portion is disposed between the pressing portion and the electrode terminals.

3. The battery cell according to claim 2, wherein at least a portion of a projection of the second protective portion in the thickness direction of the wall portion overlaps with a projection of the first insulating portion in the thickness direction of the wall portion.

4. The battery cell according to claim 3, wherein the second protective portion is fixedly connected to the first insulating portion.

5. The battery cell according to claim 4, wherein in the thickness direction of the wall portion, an end surface of the first insulating portion facing away from the electrode assembly is flush with a surface of the pressing portion facing away from the electrode assembly, and the second protective portion is fixedly connected to the end surface of the first insulating portion.

6. The battery cell according to claim 2, wherein in the thickness direction of the wall portion, at least a portion of the first insulating portion protrudes beyond the surface of the pressing portion facing away from the electrode assembly.

7. The battery cell according to claim 2, wherein the insulator further comprises a second insulating portion connected to an end of the first insulating portion facing the electrode assembly, and along the first direction, the second insulating portion is disposed between the connecting portion and the electrode terminals.

8. The battery cell according to claim 7, wherein the second insulating portion comprises a first insulating segment, a second insulating segment, and a third insulating segment, wherein the first insulating segment is connected to the first insulating portion, the first insulating segment, the second insulating segment, and the third insulating segment enclose a cladding cavity, and at least a portion of the electrode terminals is disposed within the cladding cavity.

9. The battery cell according to claim 1, wherein the second protective portion comprises a cover body and a flange, wherein one side of the cover body along the first direction is connected to the first protective portion, the other side of the cover body along the first direction is connected to the flange, and in the thickness direction of the wall portion, the cover body covers the pressing portion and the flange covers a side of the pressing portion facing the electrode terminals along the first direction.

10. The battery cell according to claim 9, wherein the insulator comprises a first insulating portion, wherein the first insulating portion is disposed between the pressing portion and the electrode terminals along the first direction, a gap is formed between the first insulating portion and the pressing portion, and at least a portion of the flange is accommodated in the gap.

11. The battery cell according to claim 10, wherein a length of the portion of the flange accommodated in the gap is greater than a minimum width of the gap.

12. The battery cell according to claim 10, wherein a thickness of the flange is less than a width of the gap.

13. The battery cell according to claim 9, wherein the flange is fixedly connected to the side of the pressing portion facing the electrode terminals along the first direction.

14. The battery cell according to claim 13, wherein a cross-section of the side of the pressing portion facing the electrode terminals along the first direction is an arcuate structure in the thickness direction of the wall portion.

15. The battery cell according to claim 1, wherein a side of a joint between the first protective portion and the second protective portion facing the fastener has a first fillet structure.

16. The battery cell according to claim 15, wherein a side of a joint between the connecting portion and the pressing portion facing the first fillet structure has a second fillet structure.

17. The battery cell according to claim 16, wherein a radius of the first fillet structure is less than or equal to a radius of the second fillet structure.

18. The battery cell according to claim 15, wherein a side of a joint between the connecting portion and the pressing portion facing the first fillet structure has a first chamfered structure.

19. The battery cell according to claim 18, wherein a projection of the first chamfered structure in the thickness direction of the wall portion has a first width, and a projection of the first chamfered structure in the first direction has a second width; wherein
the radius of the first fillet structure is less than or equal to the first width, and the radius of the first fillet structure is less than or equal to the second width.

20. The battery cell according to claim 1, wherein the pressing portion has an annular structure and is annularly disposed around the electrode terminals.

21. The battery cell according to claim 1, wherein the battery cell further comprises a sealing member, and at least a portion of the sealing member is located between the wall portion and the electrode terminals.

22. The battery cell according to claim 1, wherein the housing comprises a housing body and an end cap, wherein one end of the housing body has an opening, the end cap covers the opening, the housing body comprises a side wall and a bottom wall, the side wall is annularly disposed outside the electrode assembly, the bottom wall is disposed opposite the opening, and the wall portion is the end cap, the bottom wall, or the side wall.

23. A battery, wherein the battery comprises the battery cell according to claim 1.

* * * * *